(12) United States Patent
Karaki et al.

(10) Patent No.: US 7,905,568 B2
(45) Date of Patent: Mar. 15, 2011

(54) LIQUID PROPERTY DETECTION DEVICE, LIQUID CONTAINER, IMAGE FORMING DEVICE, AND LIQUID PROPERTY DETECTION METHOD

(75) Inventors: Isuke Karaki, Yokohama (JP); Satomi Yoshioka, Shiojiri (JP); Michihiro Nagaishi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 308 days.

(21) Appl. No.: 12/213,732

(22) Filed: Jun. 24, 2008

(65) Prior Publication Data

US 2009/0015622 A1 Jan. 15, 2009

(30) Foreign Application Priority Data

| Jun. 29, 2007 | (JP) | ................................. 2007-171641 |
| Jun. 29, 2007 | (JP) | ................................. 2007-171642 |
| Jun. 29, 2007 | (JP) | ................................. 2007-171643 |
| Aug. 28, 2007 | (JP) | ................................. 2007-220688 |

(51) Int. Cl.
*B41J 29/393* (2006.01)
(52) U.S. Cl. ............................................. 347/19; 347/7
(58) Field of Classification Search .................... 347/19, 347/14, 7, 50, 84–86, 8
See application file for complete search history.

(56) References Cited

U.S. PATENT DOCUMENTS

| 5,492,782 | A | 2/1996 | Higley |
| 5,841,448 | A | 11/1998 | Moriyama et al. |
| 6,447,592 | B1 | 9/2002 | Taniguchi |
| 6,675,646 | B2 * | 1/2004 | Nishihara .................... 73/290 V |
| 6,929,343 | B2 * | 8/2005 | Farr et al. ......................... 347/19 |
| 2002/0120034 | A1 | 8/2002 | Watanabe et al. |

FOREIGN PATENT DOCUMENTS

| EP | 0 685 810 A1 | 12/1995 |
| JP | A-07-019933 | 1/1995 |
| JP | A-07-175877 | 7/1995 |
| JP | A 7-232440 | 9/1995 |
| JP | A 8-264203 | 10/1996 |
| JP | A 2003-3101 | 1/2003 |
| JP | B2 3582448 | 8/2004 |
| JP | B2 3603432 | 10/2004 |
| JP | B2 3878950 | 11/2006 |

* cited by examiner

*Primary Examiner* — Thinh H Nguyen
(74) *Attorney, Agent, or Firm* — Oliff & Berridge PLC

(57) ABSTRACT

A liquid property detection device includes: an electromotive force obtaining unit that obtains an electromotive force which is generated between two electrodes in a liquid container, the two electrodes formed by metals having respectively different ionization tendencies, and the liquid container containing a liquid so that the liquid is in contact with the two electrodes; a storage unit that stores a table showing correspondence between a property of the liquid contained in the liquid container and the electromotive force; a property determination unit that determines the property of the liquid contained in the liquid container on the basis of the electromotive force obtained by the electromotive force obtaining unit and the table stored in the storage unit; and an output unit that outputs information corresponding to the property determined by the property determination unit.

19 Claims, 21 Drawing Sheets

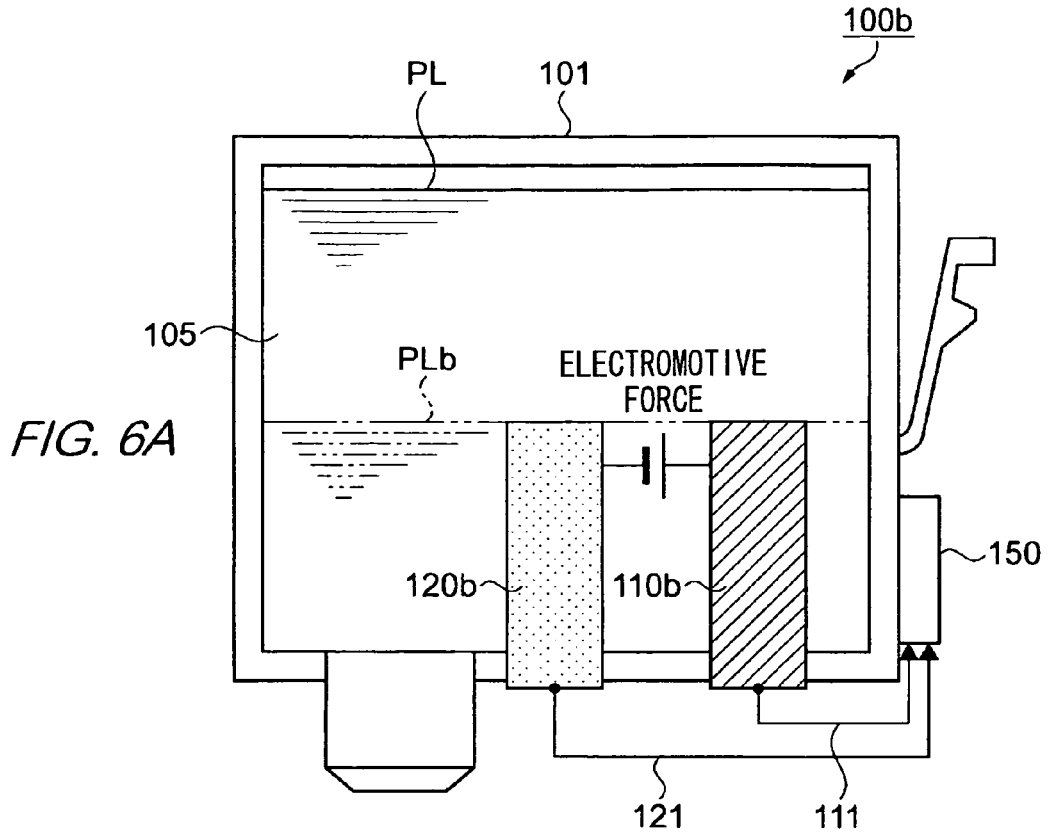
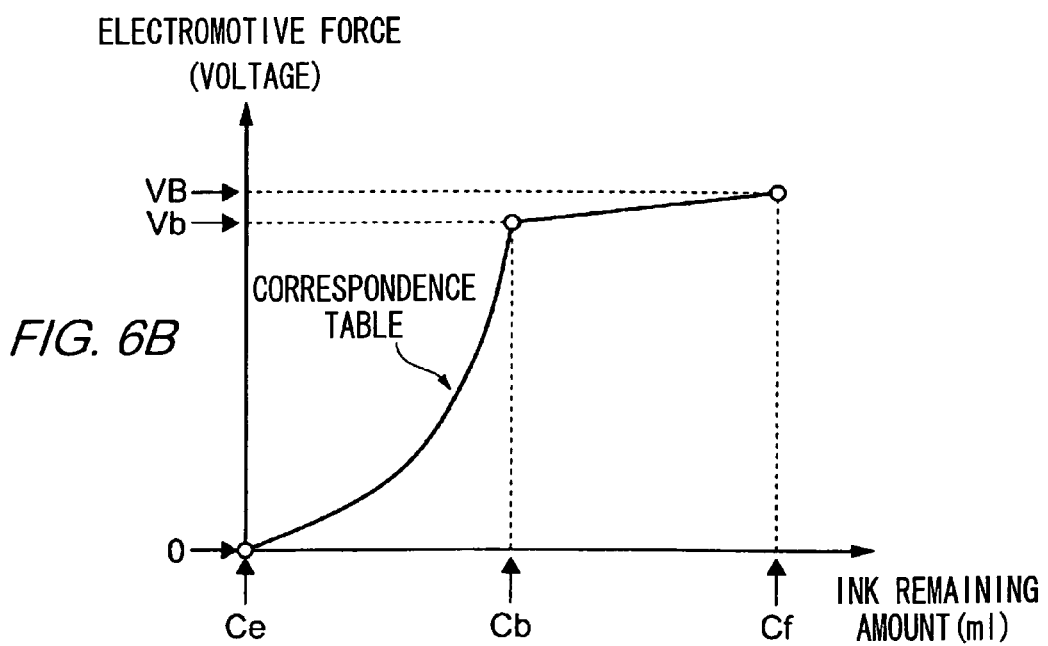

CORRESPONDENCE TABLE

| INK TYPE | COLOR | LOT NO. | INK COMPOSITION | ELECTROMOTIVE FORCE (VOLTAGE) |
|---|---|---|---|---|
| ACI | CYAN | 1 | C1 | VC1 |
| | | 2 | C1 | VC1 |
| | | 3 | C1 | VC1 |
| BCI | | 4 | C2 | VC2 |
| | | 5 | C2 | VC2 |
| AMI | MAGENTA | 1 | M1 | VM1 |
| | | 2 | M1 | VM1 |
| BMI | | 3 | M2 | VM2 |
| CMI | | 4 | M3 | VM3 |

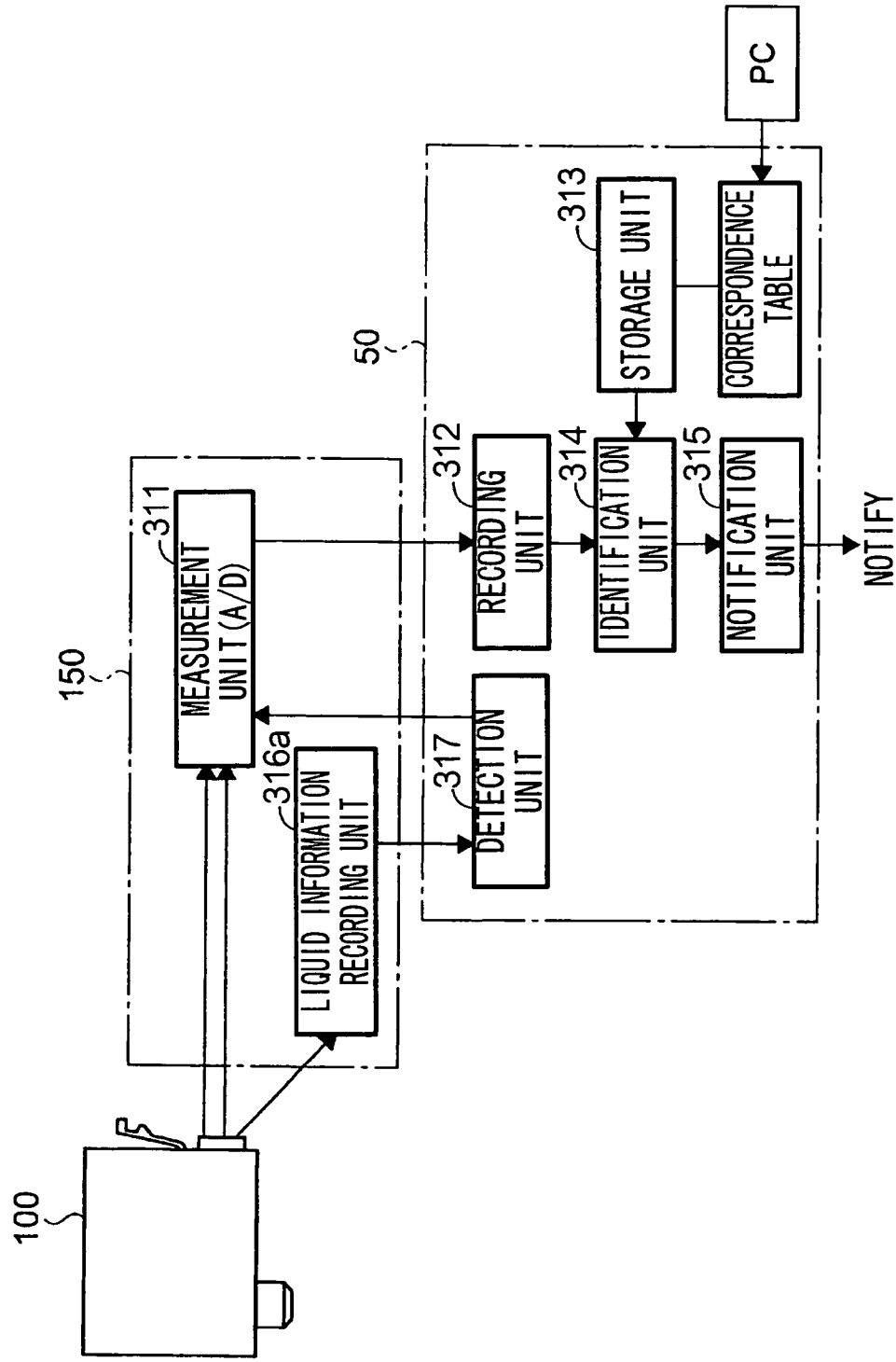

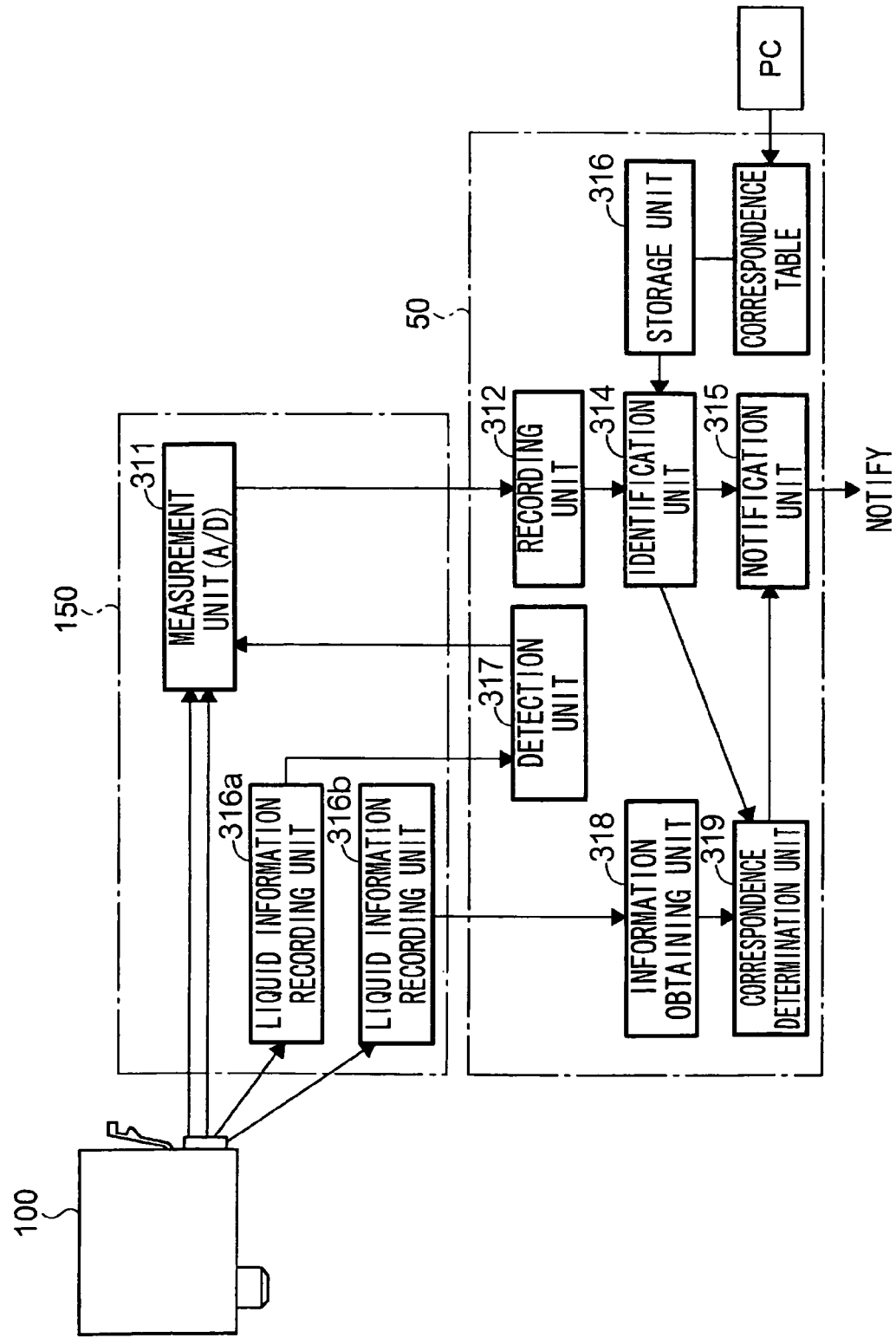

LIQUID PROPERTY DETECTION DEVICE, LIQUID CONTAINER, IMAGE FORMING DEVICE, AND LIQUID PROPERTY DETECTION METHOD

CROSS-REFERENCE TO RELATED APPLICATIONS

The entire disclosures of Japanese Patent Applications No. 2007-171641, filed Jun. 29, 2007, No. 2007-171642, filed Jun. 29, 2007, No. 2007-171643, filed Jun. 29, 2007, and No. 2007-220688, filed Aug. 28, 2007, are expressly incorporated by reference herein.

BACKGROUND

1. Technical Field

The present invention relates to a technology for detecting properties of a liquid contained in a liquid container.

2. Related Art

There are liquid jet devices which are used to form predetermined characters, shapes, and images (which will be hereinafter collectively referred to as "images") by jetting liquids contained in liquid containers through a jet head to recording media such as glass-made or resin-made substrates and clothes. An example of such a liquid jet device is an image forming device such as an ink-jet printer, which forms a predetermined image on a recording medium by jetting a liquid ink from a jet head.

In order to achieve a very user-friendly structure, there has been a demand for an ink jet printer configured so as to enable ink properties to be determined automatically. Ink properties are, for example, a composition of an ink, a remaining amount of the ink, and a presence or absence of clogging in an ink cartridge. JP-A 2003-3101 disclose inks having compositions that are suitable for particular types of recording media. When such an ink is used, it is necessary for an ink jet printer to be able to determine automatically whether the ink properties of an ink being used are suitable.

In a case of using an ink to form an image, it is necessary for a certain amount of ink to be present in an ink cartridge. For example, JP-B-3603432 discloses a technology of activating a switch when a liquid ink decreases to a predetermined remaining amount, so as to equalize a calculated remaining amount of the ink and an actual remaining amount of the ink. JP-A-7-232440 discloses a technology in which an optical detection element is provided at a position corresponding to an ink flow path where an ink flows inside a jet head. By this technology, an amount and a status of an ink are detected. Further, JP-B-3878950 discloses a technology of extracting an electromotive force to operate a toy by use of two electrodes, with a liquid being poured into a member of the toy; though this technology does not relate to image forming devices.

However, the technology JP-B-3603432 or JP-A-7-232440 requires a switching mechanism provided in an ink cartridge or requires an optical detection element provided in a jet head, which gives rise to a problem of an increase in cost of an ink cartridge.

SUMMARY

The present invention provides a technology for detecting Ink properties without use of a complicated structure.

According to an aspect of the invention, there is provided a liquid property detection device including: an electromotive force obtaining unit that obtains an electromotive force which is generated between two electrodes in a liquid container, the two electrodes being formed of metals having respectively different ionization tendencies, and the liquid container containing a liquid so that the liquid is in contact with the two electrodes; a storage unit that stores a table showing a correspondence between a property of the liquid contained in the liquid container and the electromotive force; a property determination unit that uses the electromotive force obtained by the electromotive force obtaining unit, and the table stored in the storage unit, to determine the property of the liquid contained in the liquid container; and an output unit that outputs information corresponding to the property determined by the property determination unit.

Alternatively, in the liquid property detection device as described above, the property is an amount of the liquid.

Also alternatively, in the liquid property detection device as described above, the liquid container stores information indicating a type of the liquid contained in the liquid container, the liquid property detection device further comprises an information obtaining unit that obtains information indicating a type of the liquid, from the information recording unit of the liquid container, the storage unit stores a plurality of tables respectively corresponding to types of liquids, and the property determination unit calculates an amount of the liquid contained in the liquid container, by using an electromotive force obtained by the electromotive force obtaining unit, and one of the plurality of tables corresponding to the type of the liquid indicated by the information obtained by the information obtaining unit.

Still also alternatively, in the liquid property detection device as described above, the electromotive force obtaining unit has a measurement unit that measures the electromotive force generated between the two electrodes, and obtains the electromotive force measured by the measurement unit.

Still also alternatively, in the liquid property detection device as described above, the liquid container has a measurement unit that measures the electromotive force generated between the two electrodes, and the electromotive force obtaining unit obtains the electromotive force measured by the measurement unit.

Further alternatively, the liquid property detection device further includes an input unit that inputs a signal indicating an execution of a jetting operation, form a liquid jet device having a liquid jet unit which performs a jetting operation of jetting the liquid contained in the liquid container, wherein the electromotive force obtaining unit obtains the electromotive force generated between the two electrodes, before and after the jetting operation indicated by the signal which is input by the input unit, the property determination unit further calculates a decrease of the liquid, from amounts of the liquid which are obtained before and after the jetting operation by the property determination unit, by using electromotive forces obtained before and after the jetting operation, the liquid property detection device further comprises a determination unit that determines a ratio between the decrease calculated by the property determination unit and a jet amount of the liquid which should be jetted by the jetting operation, and the output unit outputs information corresponding to a determination result of the determination unit.

Still further alternatively, in the liquid property detection device as described above, the liquid jet unit can execute a plurality of jetting operations including a jetting operation in which a jet amount of the liquid is constant, and the electromotive force obtaining unit obtains electromotive forces before and after the jet amount of the liquid is constant among the plurality of liquid jetting operations.

Still further alternatively, in the liquid property detection device as described above, the determination unit determines whether or not the ratio between the decrease calculated by the property determination unit and the jet amount of the liquid which should be jetted by the jetting operation falls within each of a plurality of ranges, and the output unit outputs information corresponding to one of the plurality of ranges in which the ratio falls.

Still also alternatively, in the liquid property detection device as described above, the property is a type of a liquid.

Further alternatively, in the liquid property detection device as described above, the liquid container has a liquid information recording unit that stores information indicating a type of a liquid to be contained in the liquid container, the liquid property detection device includes an information obtaining unit that obtains information indicating the type of the liquid, from the liquid information recording unit of the liquid container, and a determination unit that determines whether or not the type of the liquid indicated by the information obtained by the information obtaining unit, and the type of the liquid determined by the property determination unit correspond to each other, and the output unit outputs information corresponding to a determination result of the determination unit.

Still further alternatively, in the liquid property detection device, the liquid container has a liquid information recording unit that stores liquid amount information indicating an amount of the liquid contained in the liquid container, the liquid property detection device obtains the liquid amount information from the liquid amount recording unit of the liquid container, and detects whether the liquid container is filled with the liquid or not, based on the obtained liquid amount information, and the electromotive force obtaining unit obtains the electromotive force if the liquid container is determined to be filled with the liquid by the detection unit.

According to another aspect of the invention, there is provided a liquid container including: two electrodes formed of metals that have respectively different ionization tendencies; a containing part that contains a liquid to be jetted to a recording medium from a liquid jet device, with the liquid maintained in contact with the two electrodes; and a supply port that supplies the liquid contained in the containing part to the liquid jet device.

Alternatively, the liquid container as described above further includes an attachment unit that can be attached/detached to/from the liquid jet device.

Also alternatively, the liquid container further includes a connecting unit that connects the two electrodes in a manner that when the liquid container is provided in a plurality and the liquid is supplied from the plurality of the liquid containers, an electromotive force generated between the two electrodes in one of the plurality of the liquid containers is connected in series with an electromotive force generated between the two electrodes in an adjacent one of the plurality of the liquid containers.

Still also alternatively, in the liquid container, the connecting unit connects the two electrodes in a manner that the electromotive forces connected in series have a predetermined voltage.

Still also alternatively, in the liquid container, the plurality of the liquid containers respectively contain liquids which differ from each other with respect to at least one of hue, saturation, and brightness.

According to still another aspect of the invention, there is provided an image forming device including: a liquid container that has two electrodes made of metals having respectively different ionization tendencies, and has a containing part for containing a liquid so as to be in contact with the two electrodes; a liquid property detection device including an electromotive force obtaining unit that obtains an electromotive force which is generated between the two electrodes in the liquid container, a storage unit that stores a table showing correspondence between a property of the liquid contained in the liquid container and the electromotive force, a property determination unit that uses the electromotive force obtained by the electromotive force obtaining unit, and the table stored in the storage unit, to determine the property of the liquid contained in the liquid container, and an output unit that outputs information corresponding to the property determined by the property determination unit; and a liquid jet unit that performs a jetting operation for jetting the liquid contained in the liquid container.

According to still another aspect of the invention, there is provided a liquid property detection method including: obtaining an electromotive force which is generated between two electrodes in a liquid container, the two electrodes being formed of metals having respectively different ionization tendencies, and the liquid container containing a liquid so that the liquid is in contact with the two electrodes; storing a table showing correspondence between a property of the liquid contained in the liquid container and the electromotive force; determining the property of the liquid contained in the liquid container, by using the obtained electromotive force and the stored table; and outputting information corresponding to the determined property.

BRIEF DESCRIPTION OF THE DRAWINGS

The invention will now be described with reference to the accompanying drawings, wherein like numbers reference like elements:

FIG. 6A is a schematic cross-sectional view of an ink cartridge 100b according to the first modification of the first embodiment;

FIG. 6B is a graph showing an electromotive force/remaining ink amount curve concerning the ink cartridge 100b;

FIG. 13 is a functional block diagram of a liquid identification device according to the third embodiment;

FIG. 16 is a functional block diagram of a liquid identification device according to the first modification of the third embodiment;

DESCRIPTION OF EXEMPLARY EMBODIMENTS

It is known that electric power is generated by immersing two electrodes having different ionization tendencies in an electrolyte solution. In fact, this is a principle which has long been known and employed in a technology utilizing a voltaic battery. In view of this principle the present inventor realized that an ink having a composition as disclosed in JP-A-2003-3101 could function as a liquid which is substitutable as an electrolyte solution in a voltaic battery. That is, if two electrodes having different ionization tendencies are inserted in an ink cartridge, it would be possible to effectively create a voltaic battery in the ink cartridge, such that an electromotive force is generated between the two electrodes. In addition, the inventors have found that a generated electromotive force varies depending on an area of the electrodes in contact with the ink, and that a change in voltage of the electromotive force depends on a composition of the ink, including a voltage value when a change in voltage starts. Based on the principles described and on the innovative ideas of the inventor an invention has been reached, embodiments of which will now be described below.

1. First Embodiment 1-1. Structure

Figure 1:
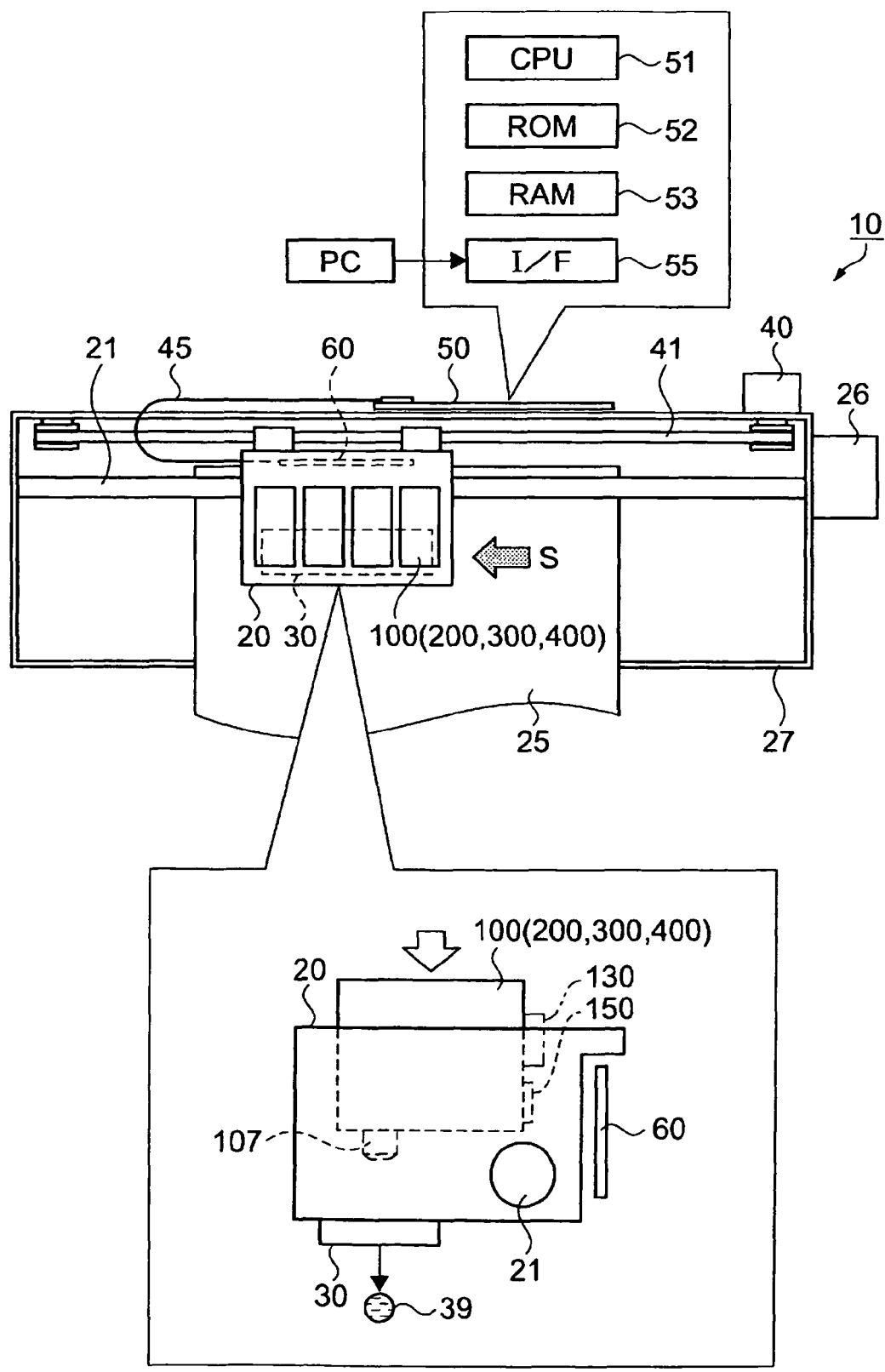
FIG. 1 schematically shows a structure of an inkjet printer 10.

FIG. 1 shows a schematic structure of an inkjet printer 10 according to a first embodiment of the invention. The inkjet printer 10 is an example of a liquid jet device having a liquid property detection device according to one embodiment of the invention. In the first embodiment, an example of dealing with a liquid amount as a liquid property will be described. Hereinafter, a liquid property detection device according to the first embodiment will be referred to as a "liquid amount detection device". A small figure surrounded by a rectangle in a lower part of FIG. 1 is a side view of a carriage 20 (described later) observed in a direction of an arrow S.

The inkjet printer 10 thus has a carriage 20. At given positions in the carriage 20, there are attached an ink cartridge 100 (yellow), an ink cartridge 200 (magenta), an ink cartridge 300 (cyan), and an ink cartridge 400 (black). The ink cartridges 100, 200, 300, and 400 are examples of liquid containers which contain respectively different colors of inks. The carriage 20 is fixed to a carriage belt 41. As the carriage belt 41 is driven by a carriage motor 40, the carriage 20 moves in a leftward or rightward direction in FIG. 1 along a guide 21 fixed to a frame 27. The carriage 20 has a jet head 30. The jet head 30 has plural nozzles. In accordance with a motion of the carriage 20, ink drops 39 of colors depending on a print image are jetted to a print paper sheet 25 from plural nozzles provided in the jet head 30 at a position behind the carriage 20. Jetting of ink drops 39 of individual colors is controlled by an actuator (not shown), and each of ink drops 39 of a predetermined amount is jetted at a predetermined timing. The print paper sheet 25 is conveyed and moved in upward and downward directions, in units of predetermined distances, by sheet feed rollers (not shown) which are driven by a drive motor 26 fixed to the frame 27. In this manner, ink drops 39 of a predetermined amount in respective different colors depending on the print image are jetted to the whole print paper sheet 25, to thereby forming an image.

A series of operations as described above are mostly controlled by a circuit installed on a sub board 60 attached to the carriage 20, and by a circuit installed on a main board 50 attached to the frame 27. The main board 50 and the sub board 60 are connected to each other by a flexible board 45.

On the main board 50, a CPU (Central Processing Unit) 51, a ROM (Read Only Memory) 52, a RAM (Random Access Memory) 53, and an interface (I/F) 55 are installed. The CPU 51 is a control device which controls operations of the inkjet printer 10. The ROM 52 is a storage device which records programs concerning the operations. The RAM 53 is a storage device which temporarily stores data required for the operations. The I/F 55 is an interface for exchanging data between circuits on the main and sub boards and for exchanging information between the circuit on the main board and an external device such as a personal computer (PC) of a user. A processing routine program for detecting a liquid amount described later is stored in the ROM 52. The RAM 53 has a buffer area for buffering data. Data such as a print job and a correspondence table described later, which are input through the I/F 55 from the PC, are stored in the buffer area.

Logic circuits for executing predetermined operations such as data exchanges with the circuit on the main board are installed on the sub board 60. The CPU 51 reads programs for respective operations, which are recorded on the ROM 52, and exchanges various signal data with the sub board 60. The CPU 51 thereby executes operations described below.

The ink cartridges 100 to 400 are inserted and fixed to be detachable from the carriage 20 by attachment/detachment units 130. The attachment/detachment units 130 each are formed to be integrated with an ink cartridge, as illustrated in sub figure surrounded by a rectangular frame appearing at the lower side of FIG. 1, and has a structure as will be described later. The ink cartridges 100 to 400 each are provided with an ink supply port 107. Inks are fed from the supply ports, flow along ink flow paths not shown, and reach nozzles for corresponding colors.

A circuit board 150 is attached to each of the ink cartridges 100 to 400. An IC chip (not shown) which records individual information specific to each ink cartridge is mounted on the circuit board 150. A connecting means not shown is provided between the circuit board 150 and the sub board 60, and is configured so as to be capable of exchanging individual information between the circuit board 150 and the sub board 60. The CPU 51 performs a processing for writing/reading individual information into/from the IC chips through the sub board 60. The individual information recorded on each of the IC chips includes, for example, at least one of an estimated remaining amount of an ink contained in an ink cartridge, a manufacturing date of the ink cartridge, a type of the contained ink, and other information concerning an ink property.

Figure 2:
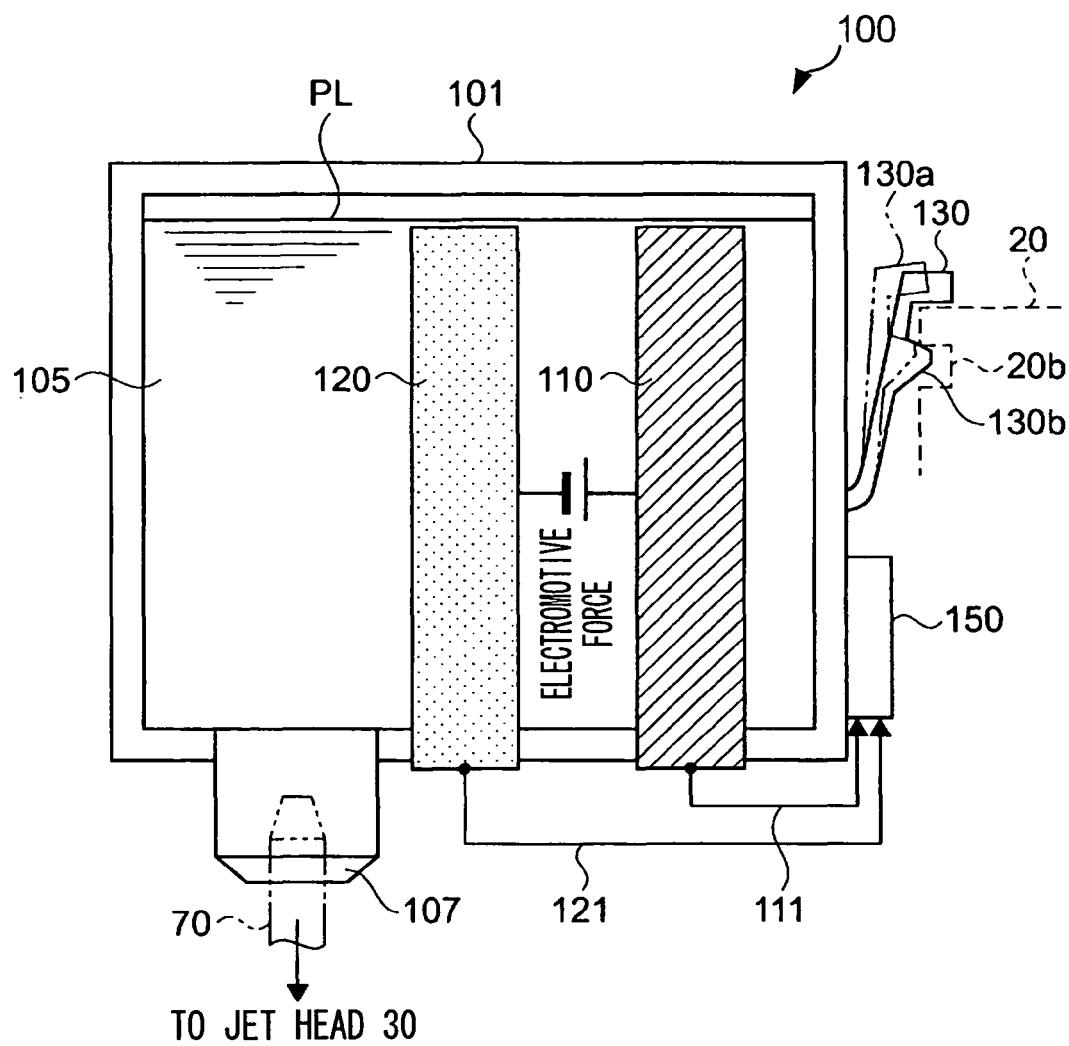
FIG. 2 is a schematic cross-sectional side view of an ink cartridge 100, viewed in a lateral direction.

FIG. 2 is a cross-sectional view where the ink cartridge 100 is viewed from one side of the ink cartridge, and schematically shows an entire structure of the ink cartridge 100. The other ink cartridges 200, 300, and 400 each have the same structure as the ink cartridge 100. Descriptions of the ink cartridges 200, 300, and 400 will be omitted herefrom.

As shown in FIG. 2, the ink cartridge 100 has an ink container 101, an attachment/detachment unit 130, a supply port 107, a circuit board 150, and two electrodes 110 and 120. The ink container 101 is made of a resin, and has an ink containing part 105 installed inside. The attachment/detachment unit 130 is installed to be integrated with the ink container 101.

The supply port 107 substantially has a shape like a pipe with an opening being provided in the center of the pipe. The supply port 107 functions to supply the jet head 30 with an ink. When the ink cartridge 100 is attached to the carriage 20, a supply needle 70 provided on the carriage 20 is inserted in the opening. After the supply needle 70 is inserted in the opening, an ink contained in the ink containing part 105 flows out into the supply needle 70, to supply the ink to the jet head 30. A valve mechanism may be provided at the opening of the supply port 107. When the ink cartridge 100 is not attached to the carriage 20, the supply mechanism sets the opening in a closed state in which no ink flows out. When the ink cartridge 100 is attached to the carriage 20 and the supply needle 70 is inserted, the valve mechanism sets the opening in an opened state.

The attachment/detachment unit 130 substantially has a shape like a hook as shown in the figure. The attachment/detachment unit 130 is installed so as to bend into a state as indicated by a two-dot chain line (denoted at a reference symbol 130a) when the ink cartridge 100 is pressed in a downward direction toward the lower side of the figure. Therefore, the ink cartridge 100 is securely attached to the carriage 20 when the ink cartridge 100 is pressed into the carriage 20 in a direction from the upper side of the figure. Once attached, a groove part 20b of the carriage 20 engages with a protruding part 130b, thereby fixing the ink cartridge 100 so as not to become detached in an upward direction shown in the figure. When detaching the ink cartridge 100 from the carriage 20, the attachment/detachment unit 130 is first bent in a state as indicated by the attachment/detachment unit 130 (denoted at a reference symbol 130a), and is then pulled up in an upward direction shown in the figure. In this manner, the ink cartridge 100 is configured to be attachable/detachable to/from the carriage 20, i.e., the inkjet printer 10. The attachment/detachment unit 130 shown in FIG. 2 is merely an example. For the attachment/detachment unit 130 any other suitable structure can be adopted, such as a screw, insofar as the attachment/detachment unit 130 can be detached.

The electrodes 110 and 120 are inserted in the ink containing part 105 so as to make contact with an ink contained in the ink containing part 105. Ends of the electrodes 110 and 120 are fixed to a bottom of the ink container 101 (in the lower side of the figure). The electrodes 110 and 120 each are connected to predetermined terminals (not shown) provided on the circuit board 150 by connecting members 122 and 121, respectively.

In the first embodiment, the electrode 110 is made of a copper plate and the electrode 120 is made of a zinc plate. Thus, the ink cartridge 100 forms a structure equivalent to a voltaic battery by using two such electrodes which have respectively different ionization tendencies. As disclosed in the foregoing JP-B-3603432, a hydrogen ion exponent (pH) of the ink contained in the ink containing part 105 varies depending on the composition of the ink. That is, inks which have respectively different compositions have respectively different functions as electrolyte solutions. Accordingly, a size of an electromotive force which is generated between the electrodes 110 and 120 depends on a composition of an ink.

Which of the electrodes 110 and 120 are respectively polarized, either positively or negatively, depends on a relationship in strength between ionization tendencies relative to the respective electrodes. In the first embodiment, the electrode 120 consist of (formed by) zinc having a greater ionization tendency than copper serves as a negative polarity. The electrodes 110 and 120 are not limited to copper and zinc plates, respectively. In brief, any material may be used for the electrodes 110 and 120 insofar as the material causes an electromotive force to be generated between the electrodes 110 and 120 when the material dissolves in an ink.

The two electrodes consist of materials having different ionization tendencies are in contact with the ink contained in the ink containing part 105. Then, an electromotive force is generated between the two electrodes 110 and 120 respectively functioning as positive and negative poles, as shown in FIG. 2. The magnitude of the generated electromotive force is proportional to a quantity of free electrons which are generated when the materials of the electrodes dissolve in the ink. Since the quantity of free electrons depends on contact areas with the ink, the electromotive force depends on areas of the two electrodes where the electrodes are in contact with the ink. In this example, the electrodes are located so that the contact areas with the ink decrease as the remaining amount of the ink decreases. Therefore, the electromotive force generated by the ink cartridge 100 varies depending on a remaining amount of the ink contained in the ink containing part 105.

Figure 3:
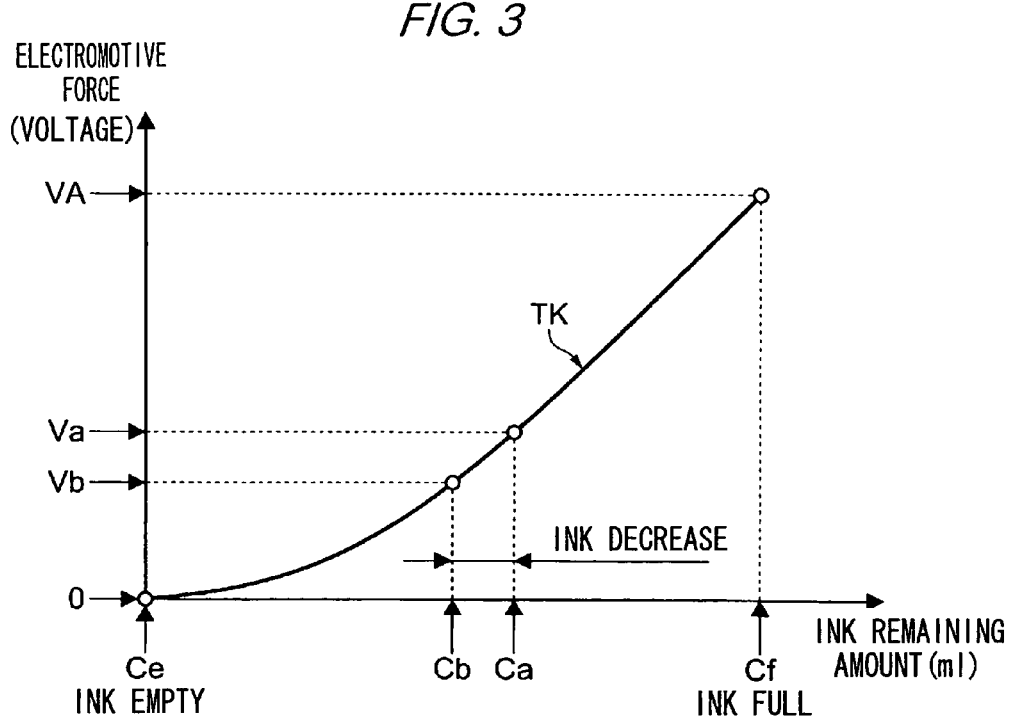
FIG. 3 is a graph showing a relationship between a remaining ink amount and an electromotive force.

FIG. 3 shows an example of a relationship between the remaining amount of the ink and the electromotive force. In FIG. 3, the vertical axis represents the electromotive force (unit: voltage), and the horizontal axis represents the remaining ink amount (unit: milli-liter). A curve TK indicates a relationship between the remaining ink amount and the electromotive force. In this example, the electromotive force is VA when the remaining ink amount is Cf. The remaining ink amount Cf is equivalent to a state of the ink containing part 105 filled with the ink.

As ink drops are jetted from the nozzle, the ink contained in the ink cartridge 100 decreases accordingly, and the liquid surface of the ink lowers. As the liquid surface of the ink lowers, the contact areas between the electrodes 110 and 120 and the ink decrease, i.e., the areas of dissolving parts of electrode materials decrease. Simultaneously, the volume of the ink capable of dissolving the electrode materials decreases accordingly. As a result, the quantity of free electrons which are generated as the electrode materials dissolve as the ink decreases. The example of FIG. 3 shows that the electromotive force is Va (<VA) when the remaining ink amount is Ca. In addition, the electromotive force is Vb when the remaining ink amount is Cb. It is hence understood that, when the electromotive force decreases from Va to Vb, the ink is reduced by "Ca−Cb".

As the ink further decreases to a state in which no ink remains in the ink containing part 105; or in other words, the ink containing part 105 becomes empty. The electrodes 110 and 120 are not substantially in contact with the ink any more. In the example of FIG. 3, an empty state of the ink containing part 105 is equivalent to a remaining ink amount Ce. When the remaining ink amount is Ce, the electromotive force is zero voltage.

The liquid amount detection device according to the first embodiment detects a remaining ink amount as a liquid property, depending on the magnitude of a generated electromotive force.

Figure 4:
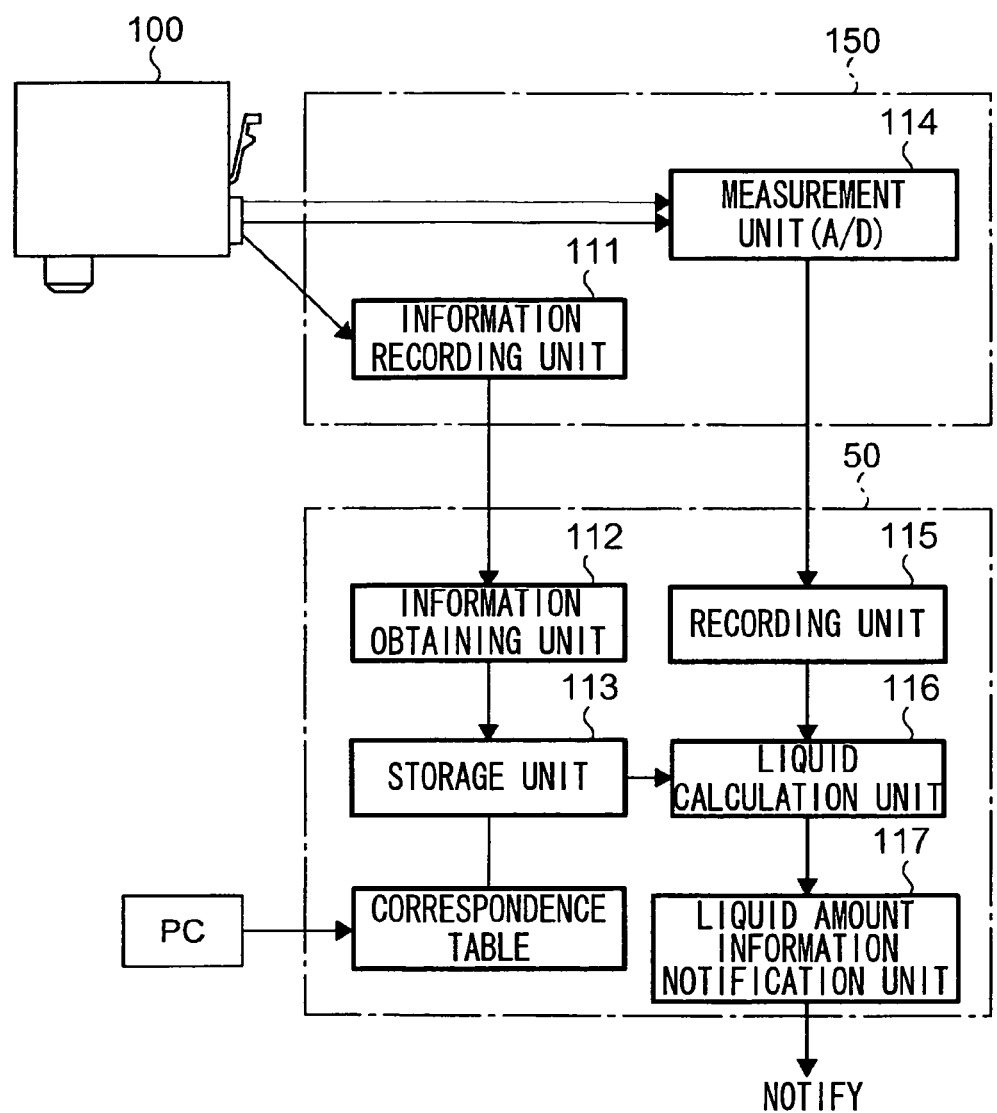
FIG. 4 shows a functional structure of a liquid amount detection device according to a first embodiment.

FIG. 4 shows a functional structure of the liquid amount detection device according to the first embodiment. In this embodiment, the CPU 51 functions as the liquid amount detection device shown in FIG. 4 by executing a processing program stored in the ROM 52 while using the RAM 53 as a working area in the hardware structure shown in FIG. 1. The liquid amount detection device includes, as functional components, an information obtaining unit 112, a storage unit 113, a measurement unit 114, a recording unit 115, a liquid amount calculation unit 116, and a liquid information notification unit 117. Among these functional components, the measurement unit 114 is installed on the circuit board 150, and the other units are installed on the main board 50. Individual ones of these units mainly perform processings as follows.

The information obtaining unit 112 obtains information concerning a liquid type from an information recording unit 111 provided on the circuit board 150. In this embodiment, each of the IC chips described previously functions as the information recording unit 111. Depending on an ink type obtained by the information obtaining unit 112, the storage unit 113 obtains and stores a correspondence table indicating a relationship between a remaining ink amount and an electromotive force, from among individual information data items of ink cartridges which are supplied from a PC. The measurement unit 114 measures an electromotive force generated between the two electrodes. The measurement unit 114 analog-to-digital-converts (or A/D converts) the electromotive force generated between the two electrodes at a predetermined timing, into digital data. The measurement unit 114 supplies the converted digital data to the recording unit 115. The recording unit 115 records the supplied digital data onto a predetermined area in the RAM 53. The liquid amount calculation unit 116 calculates a remaining ink amount contained in the ink cartridge by using the recorded digital data and the correspondence table stored in the storage unit 113. The liquid amount information notification unit 117 outputs information corresponding to the calculated remaining ink amount.

1-2. Operation

Figure 5:
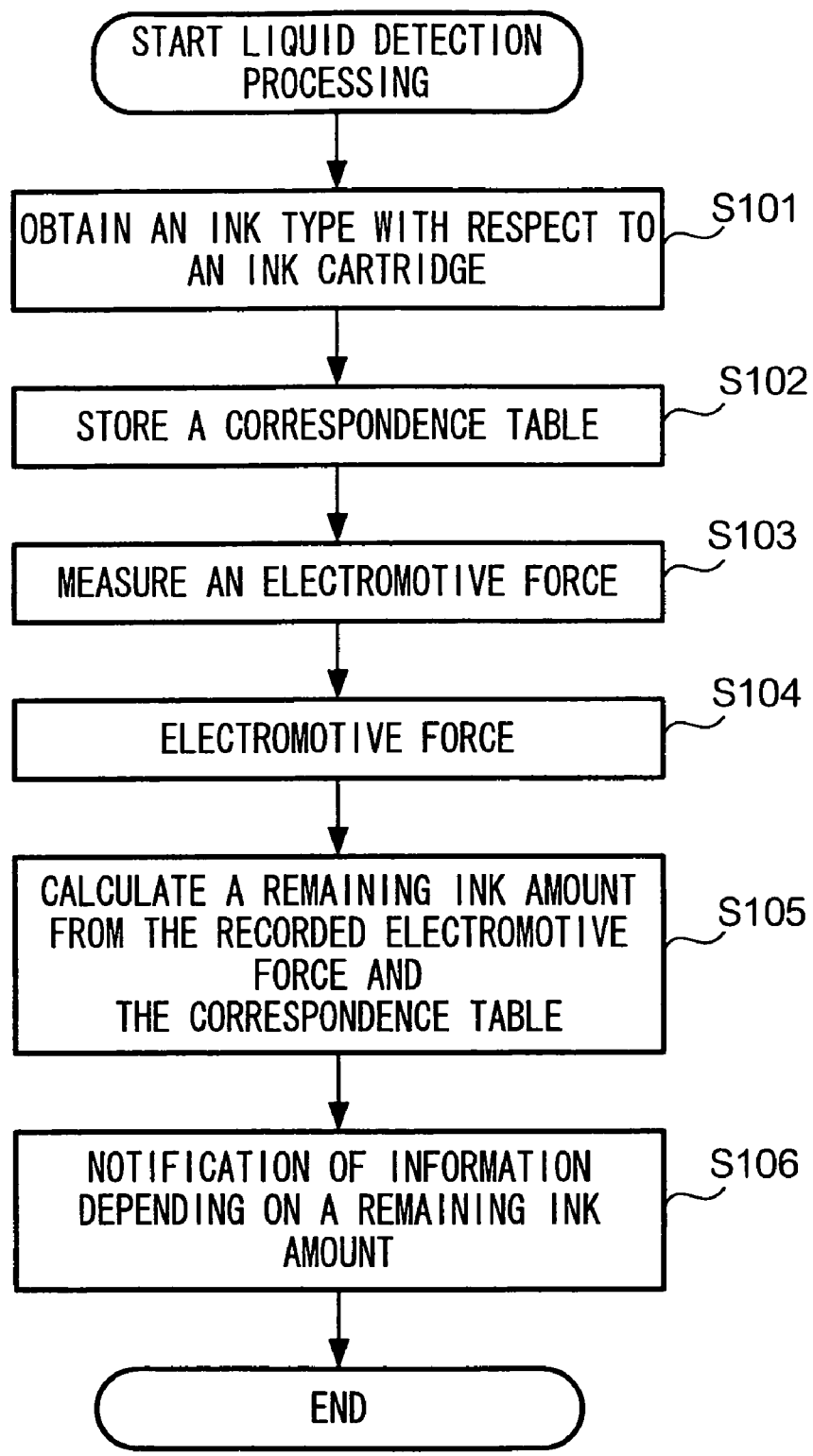
FIG. 5 is a flowchart showing an operation of the liquid amount detection device according to the first embodiment.

FIG. 5 is a flowchart showing an operation of the liquid amount detection device according to the first embodiment. The flowchart shown in FIG. 5 starts, for example, when a user of the inkjet printer 10 manipulates a predetermined manipulation button (not shown), when any one of the ink cartridges 100 to 400 is attached to the carriage, or when the power supply of the inkjet printer 10 is turned on. The first embodiment will be described referring to an example of performing processings along the flowchart one time. However, the processings of the flowchart may be repeated when a predetermined time elapses or at a timing when printing is completed for a predetermined number of recording media.

In a step S101, the CPU 51 obtains an ink type of an ink cartridge. More specifically, the CPU 51 reads individual information from an IC chip mounted on the circuit board 150. The read individual information includes data concerning an ink type contained in the ink cartridge 100. In this example, data indicating a color and a composition of an ink is obtained as data concerning the ink type. The data concerning an ink type is used to specify an electromotive force which is generated when the ink containing part 105 is full of an ink. Any data may be used as the data concerning an ink type insofar as the data can specify an electromotive force.

In a step S102, the liquid amount detection device stores a correspondence table. In this example, data including at least one correspondence table which describes newest data, is supplied, together with a printing job, from the PC. Each time the data is supplied, the CPU 51 extracts a correspondence table relating to an ink type from the data. The CPU 51 stores the extracted correspondence table into the RAM 53 to achieve updating. The correspondence table defines data indicating remaining ink amounts in the ink containing part 105, and data indicating electromotive forces which are generated between two electrodes at the remaining ink amounts, respectively. That is, data of the correspondence table indicates a curve TK as shown in FIG. 3. In this example, data of the correspondence table is recorded as the curve TK as discrete plots at predetermined volumetric intervals (e.g., intervals of 5 ml).

If the relationship between the remaining ink amount and the electromotive force is maintained substantially constant independent from ink types, there is no need to execute the processing for obtaining an ink type from an ink cartridge. In addition, if the inkjet printer 10 uses only one type of ink or if the type of ink is limited due to specifications or standards of the device, the processing for obtaining an ink type from an ink cartridge need not be carried out. In such cases, the ink type is prestored in the ROM 52. The CPU 51 obtains an ink type by reading an ink from the ROM 52. In this case, in a step S102, the CPU 51 further stores, in the RAM 53, a correspondence table relating to the ink type read from the ROM 52.

In a step S103, the CPU 51 measures an electromotive force. In this example, the CPU 51 controls a measurement circuit (not shown) mounted on the circuit board 150 provided on the ink cartridge 100, to measure an electromotive force. The measurement circuit measures a voltage value as analog data which is generated between two electrodes. The measurement circuit converts the voltage value into digital data and outputs the digital data. This configuration satisfactorily shortens a lead wire which electrically leads the electromotive force generated by the ink cartridge 100 to the measurement circuit, with the electromotive force maintained as analog data. A voltage drop caused by the lead wire is therefore suppressed, and the generated electromotive force can accordingly be measured more accurately.

In a step S104, the CPU 51 records the measured electromotive force. The CPU 51 stores a voltage value converted into digital data by the measurement circuit, in a predetermined recording area in the RAM 53.

In a step S105, the CPU 51 calculates a remaining ink amount by using a measured electromotive force and a correspondence table. More specifically, the CPU 51 reads the electromotive force recorded on the RAM 53 and compares the electromotive force with electromotive forces written in the correspondence table. The CPU 51 reads a remaining ink amount corresponding to the read electromotive force, from the correspondence table. In this example, electromotive forces are recorded as discrete values in the correspondence table. The CPU 51 searches for an electromotive force which is closest to the measured electromotive force, from the correspondence table, and reads a remaining ink amount corresponding to the closest electromotive force searched for.

Data of the correspondence table is not limited to a type of table which lists coordinates of plotted points on a curve TK but may write a function which expresses the curve TK. In this case, the CPU 51 calculates a remaining ink amount by substituting a measured electromotive force in the function. In brief, any data form may be available for the correspondence table insofar as an electromotive force can be converted into a remaining ink amount.

In a step S106, the CPU 51 notifies a user of information depending on a remaining ink amount. In this example, information is notified by displaying a predetermined sentence on a liquid crystal display panel (not shown) provided in the inkjet printer 10. The CPU 51 selects an appropriate sentence from among sentences pre-stored in the ROM 52 and causes the appropriate sentence to be displayed. For example, if the electromotive force is VA, the remaining ink amount is calculated to be Cf (FIG. 3), and the CPU 51 then controls the liquid crystal display panel to show a sentence "Ink Full". Otherwise, if the electromotive force is 0 voltages, the remaining ink amount is calculated to be Ce, and the CPU 51 then controls the liquid crystal display panel to show a sentence "Ink Empty". Still otherwise, if the electromotive force is Va, the remaining ink amount is calculated to be Ca, and the CPU 51 then controls the liquid crystal display panel to show "Ink Half".

Based on notification as described above, the user of the inkjet printer 10 can easily confirm whether the remaining ink amount is enough to carry out printing or not. According to the first embodiment, a remaining ink amount of an ink contained in an ink cartridge can be detected without using a switch. Therefore, the shape of the ink cartridge is not limited by the switch. Further, since an electromotive force generated between two electrodes varies depending on the remaining ink amount, the remaining ink amount can be detected accurately not only when the remaining ink amount is full or empty but also when the remaining ink amount is neither full nor empty. Accordingly, the user can very accurately check whether a sufficient amount of ink to stably form an image remains in the ink cartridge.

1-3. Modifications

The first embodiment of the invention has been described above. The invention is not limited to the above embodiment but is practicable in various forms. Examples of modifications will now be described below. Two or more of the modifications described below may be combined in practical use.

1-3-1. First Modification

A layout of two electrodes in the ink containing part 105 is not limited to that described in the first embodiment. In the above embodiment, the two electrodes are inserted so that areas where the two electrodes are in contact with an ink gradually decrease as the ink decreases in accordance with consumption of the ink from a state "Ink Full". In place of such a layout, for example, the two electrodes may be located so that the areas where the two electrodes are in contact with the ink decreases a remaining ink amount decrease as the remaining ink amount decreases to below a predetermined amount in accordance with consumption of the remaining ink amount. According to a configuration employing this layout, the electromotive force is substantially constant until the remaining ink amount reaches a predetermined amount. After the remaining ink amount reaches the predetermined amount, the electromotive force decreases. Therefore, a state where the remaining ink amount reaches the predetermined amount can be detected and notified accurately.

FIG. 6A is a schematic cross-sectional side view of an ink cartridge 100b according to the first modification. FIG. 6B shows an electromotive force/remaining ink amount curve (in a correspondence table) concerning the ink cartridge 100b.

As shown in FIG. 6A, the electrodes 110b and 120b are inserted in the ink containing part 105 so that contact areas with an ink start decreasing when a liquid surface of the ink falls such that it is lower than a liquid surface PLb in accordance with decrease of the ink contained in the ink containing part 105. Therefore, when the remaining ink amount stays between liquid surfaces PL and PLb, the electromotive force is substantially constant or decreases by an amount equivalent to a decrease in volume of the ink capable of dissolving materials of the electrodes. As the liquid surface of the ink falls such that it is lower than the liquid surface PLb, the contact areas of the electrodes with the ink decrease in accordance with lowering of the liquid surface, and the generated electromotive force decreases accordingly. Thus, inclination of the electromotive force/remaining ink amount curve changes at the liquid surface PLb as a boundary. In brief, according to the first modification, two electrodes are located so that contact areas of the two electrodes with an ink decrease in accordance with consumption of the ink when the remaining ink amount decreases such that it is lesser than a predetermined amount.

As a result, as indicated by the electromotive force/remaining ink amount curve shown in FIG. 6B, the electromotive force changes more when the remaining ink amount decreases such that it is lesser than a remaining ink amount Cb corresponding to the liquid surface PLb than when the remaining ink amount is greater than the remaining ink amount Cb. That is, the electromotive force changes more after the remaining ink amount decreases, such that it is lesser than Cb, than when the remaining ink amount is between Cf and Cb. In other words, a ratio of change of the remaining ink amount to change of the electromotive force decreases as the remaining ink amount decreases such that it is lower than Cb.

As described above, the CPU 51 searches a correspondence table for an electromotive force which is closest to a recorded electromotive force, in order to calculate a remaining ink amount. At this time, a change of the remaining ink amount is smaller in relation to a change of the electromotive force within a certain time length in which the ink further decreases from the remaining ink amount Cb, compared with the other parts of the electromotive force/remaining ink amount curve. This means that a change of the remaining ink amount per change of the electromotive force equivalent to one unit is small, i.e., resolution of the remaining ink amount is high. Accordingly, a state of the remaining ink amount which has decreased below a predetermined amount can be accurately detected from a generated electromotive force and a correspondence table, by configuring electrodes as in the first modification.

1-3-2. Second Modification

In the second modification, an example of another layout of two electrodes will be described. In this modification, two electrodes are provided so as to make contact with an ink when a remaining ink amount is greater than a predetermined amount. According to this configuration, an electromotive force is generated while the remaining ink amount is greater than the predetermined amount. Once the remaining ink amount decreases so that it is lesser than the predetermined amount, no electromotive force is generated any more. Accordingly, a state of in which the remaining ink amount reaches the predetermined amount can be detected and notified more accurately. In addition, in this modification, at least one of the two electrodes is constituted of plural electrodes. The plural electrodes are provided so that ends of the electrodes are located at different positions which correspond to different liquid surface levels, respectively. That is, the plural electrodes are kept in contact with an ink until the ink decreases to different remaining ink amounts, respectively.

Figure 7A:
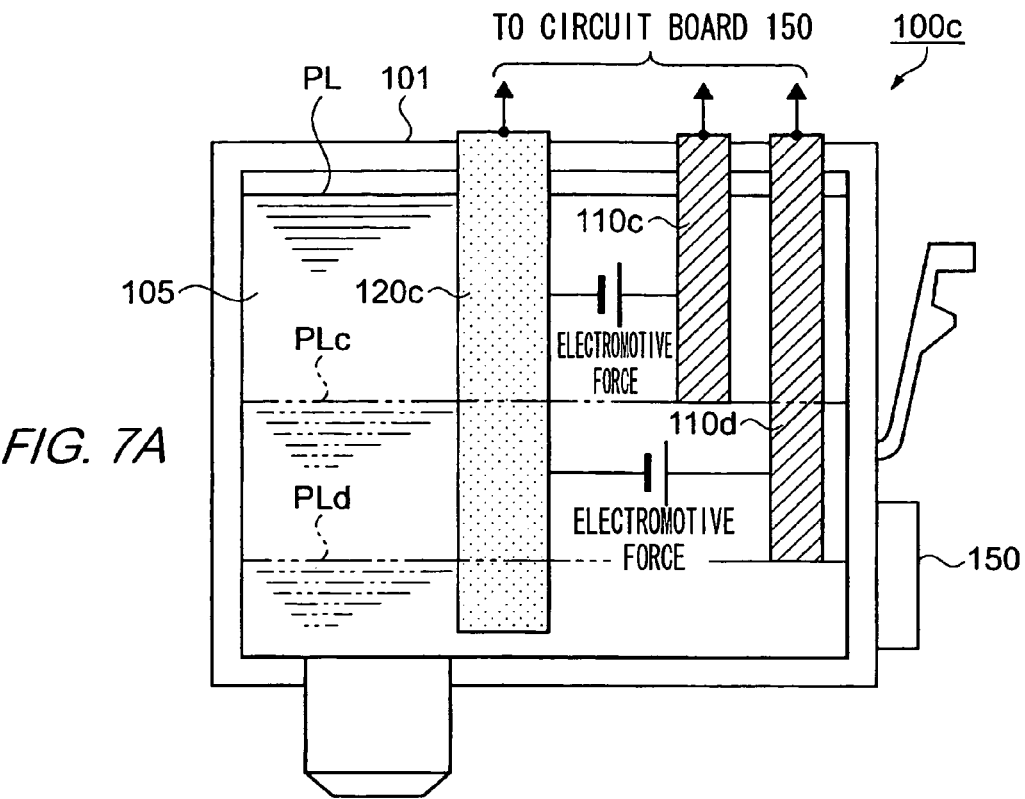
FIG. 7A is a schematic cross-sectional side view of an ink cartridge 100c according to the second modification of the first embodiment.
Figure 7B:
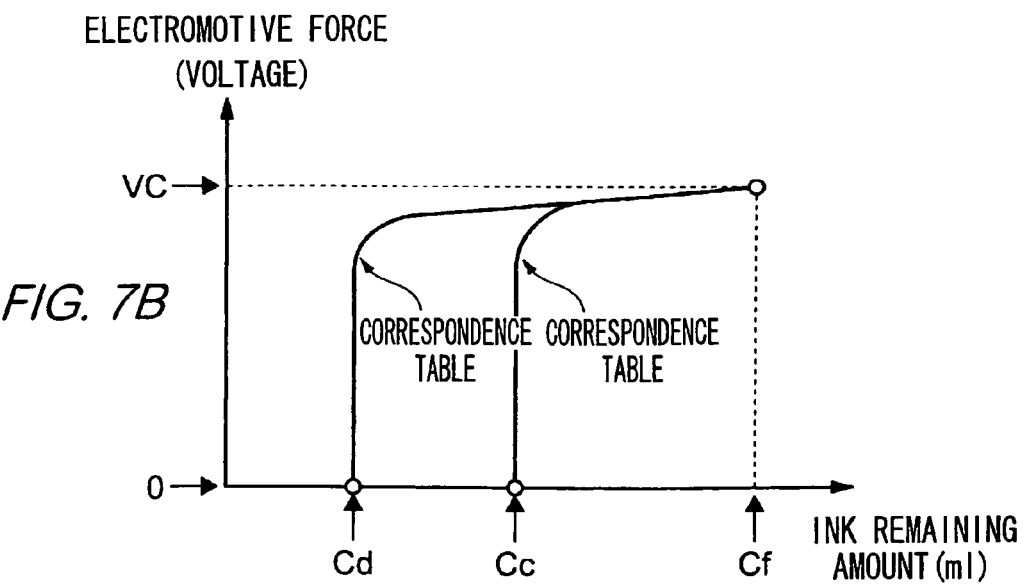
FIG. 7B is a graph showing an electromotive force/remaining ink amount curve concerning the ink cartridge 100c.

FIG. 7A is a schematic cross-sectional side view of an ink cartridge 100c according to the second modification. FIG. 7B shows an electromotive force/remaining ink amount curve relating to the ink cartridge 100c.

As shown in FIG. 7A, in the ink cartridge 100c the electrode 110 includes two electrodes 110c and 110d. The electrodes 110c and 110d are respectively located so that lower ends of the electrodes 110c and 110d are respectively positioned at levels corresponding to liquid surfaces PLc and PLd. That is, the electrode 110c is inserted in the ink containing part 105 so as to make contact with an ink while the liquid surface of the ink is between PL and PLc. The electrode 110d is inserted in the ink containing part 105 so as to make contact with the ink while the liquid surface of the ink is between PL and PLd. On the other hand, the electrode 120c is inserted in the ink containing part 105 so as to make contact with the ink until the liquid surface of the ink decreases such that it is lower than a level corresponding to the liquid surface PLd.

According to the concept of this example, the electrodes 110c and 120c form one battery, and the electrodes 110d and 120c form another battery. The CPU 51 measures an electromotive force generated between two electrodes, for each of the two batteries. Appropriate correspondence tables respectively for the two batteries are used. In FIG. 7B, an electromotive force/remaining ink amount curve which is captioned "correspondence table 1" relates to one of the batteries including the electrodes 110c and 120c. In FIG. 7B, another electromotive force/remaining ink amount curve which is captioned "correspondence table 2" relates to the other battery including the electrodes 110d and 120c. The CPU 51 calculates a remaining ink amount by referring to the two correspondence tables.

In this example, when the liquid surface of the ink reaches PLc, an electromotive force generated between the electrodes 110c and 120c becomes zero voltage. A remaining ink amount corresponding to the electromotive force of zero voltage is read by referring to the correspondence table 1, and the remaining ink amount is thereby specified to be Cc. When the liquid surface of the ink further lowers to the level of the liquid surface PLd, the electromotive force generated between the electrodes 110d and 120c becomes zero voltage. The CPU 51 reads a remaining ink amount corresponding to the electromotive force zero voltage by referring to the correspondence table 2, and the remaining ink amount is thereby specified to be Cd.

Thus, particularly in the second modification, a remaining ink amount can be detected depending on whether an electromotive force is generated or not, particularly depending on the configuration described above in which a positive or negative pole is constituted of plural electrodes. Accordingly, a remaining ink amount can be detected more easily and accurately. The second modification is particularly effective when a change of an electromotive force generated between two electrodes in accordance with a decrease in contact areas between the electrodes and an ink is small.

1-3-3. Other Modifications

The layout of the measurement unit 114 is not limited to that described in the first embodiment. In the example shown in FIG. 4, the measurement unit 114 is installed on the circuit board 150. However, the measurement unit 114 may be installed on the main board 50 or the sub board 60. In the first embodiment, the measurement unit is installed on the circuit board 150 in order to correctly measure a generated electromotive force. However, if a generated electromotive force is sufficiently large relative to a voltage drop and therefore relatively reduces an influence of the voltage drop, the measurement unit 114 need not particularly be installed on the circuit board 150.

The function of the liquid amount information notification unit 117 is not limited to that described in the first embodiment. As has been described in the flowchart shown in FIG. 5 in the first embodiment, the liquid amount information notification unit 117 notifies a user of a determination result by displaying a predetermined sentence on a liquid crystal display panel. However, the liquid amount information notification unit 117 may notify a user of information concerning a liquid amount by any other method than that described above. For example, the liquid amount information notification unit 117 may provide a notification by using a sound. If an inkjet printer is provided with a sound generating member, various remaining ink amounts can be notified by changing a way in which a sound is generated (e.g., by changing a frequency, a sound volume, or a sound generation pattern).

Otherwise, the liquid amount information notification unit 117 may output a trigger signal relating to an operation of an inkjet printer. For example, the liquid amount information notification unit 117 outputs, to the carriage 20, a trigger signal for stopping a printing operation. As a result, if an ink of an adequate amount for a printing volume does not remain in each ink cartridge, the printing operation is stopped. Accordingly, each of a print job which is not expected to complete stable image formation is eliminated. As an alternative, the liquid amount information notification unit 117 may output a trigger signal for canceling a printing operation to a PC. In this case, the PC executes a processing for canceling a printing job for the inkjet printer 10.

Still otherwise, when an ink decreases and reaches a predetermined remaining ink amount, the liquid amount information notification unit 117 may give notification by outputting a predetermined trigger signal so as to equalize a calculated remaining ink amount to an actual remaining ink amount, in place of a switching operation as disclosed in the foregoing JP-B-3603432. In this manner, a calculated remaining ink amount and an actual remaining ink amount can be equalized to each other without providing a switching mechanism. Therefore, no limitation is put on the shape of each ink cartridge, or increase in cost for each ink cartridge can be restricted. In brief, the liquid amount information notification unit needs only to be capable of outputting information concerning a liquid amount of an ink.

The method of updating a correspondence table is not limited to that described in the first embodiment. In the first embodiment, a correspondence table is updated by using data received together with a print job in a step S102 in FIG. 5. As an alternative, for example, a correspondence table may be supplied together with a version-up program, in a course of a version-up processing for a printer driver of an inkjet printer. A PC transmits data used for updating a correspondence table, during a version-up processing for a printer driver. With this configuration, data of a print job does not include data of a correspondence table, and accordingly, the volume of data of a print job is reduced.

The liquid contained in the liquid container is not limited to an ink. For example, the liquid may be a recording liquid or a functional liquid for forming an image on a glass or resin substrate as a component forming part of a liquid crystal panel or an organic EL panel. In brief, any liquid can be used insofar as the liquid functions as an electrolyte solution for forming a battery.

The liquid jet device is not limited to an inkjet printer but may be any other device insofar as the device jets a liquid.

The shape of the ink cartridge is not limited to that described in the first embodiment. In the first embodiment, the ink cartridge has a shape which allows the ink cartridge itself to be attachable/detachable to/from an inkjet printer. However, the ink cartridge may have any other shape. For example, the ink cartridge may be of a tank type which supplies an ink through a supply pipe from an ink container.

In the first embodiment, the liquid amount detection device is incorporated in an inkjet printer as a liquid jet device. However, the liquid amount detection device may be constituted as a separate device which is independent from the liquid jet device. In this manner, a liquid amount of a contained ink can be detected by an ink cartridge alone, without attaching the ink cartridge to the inkjet printer.

2. Second Embodiment

Next, a second embodiment of the invention will be described below. In the second embodiment, a jet state is detected as a liquid property. A liquid property detection device according to the second embodiment is referred to as a "jet state detection device". Hereinafter, matters common to the first embodiment will be omitted from descriptions made below. Components common to the first embodiment will be denoted with like reference symbols, respectively.

2-1. Structure

Figure 8:
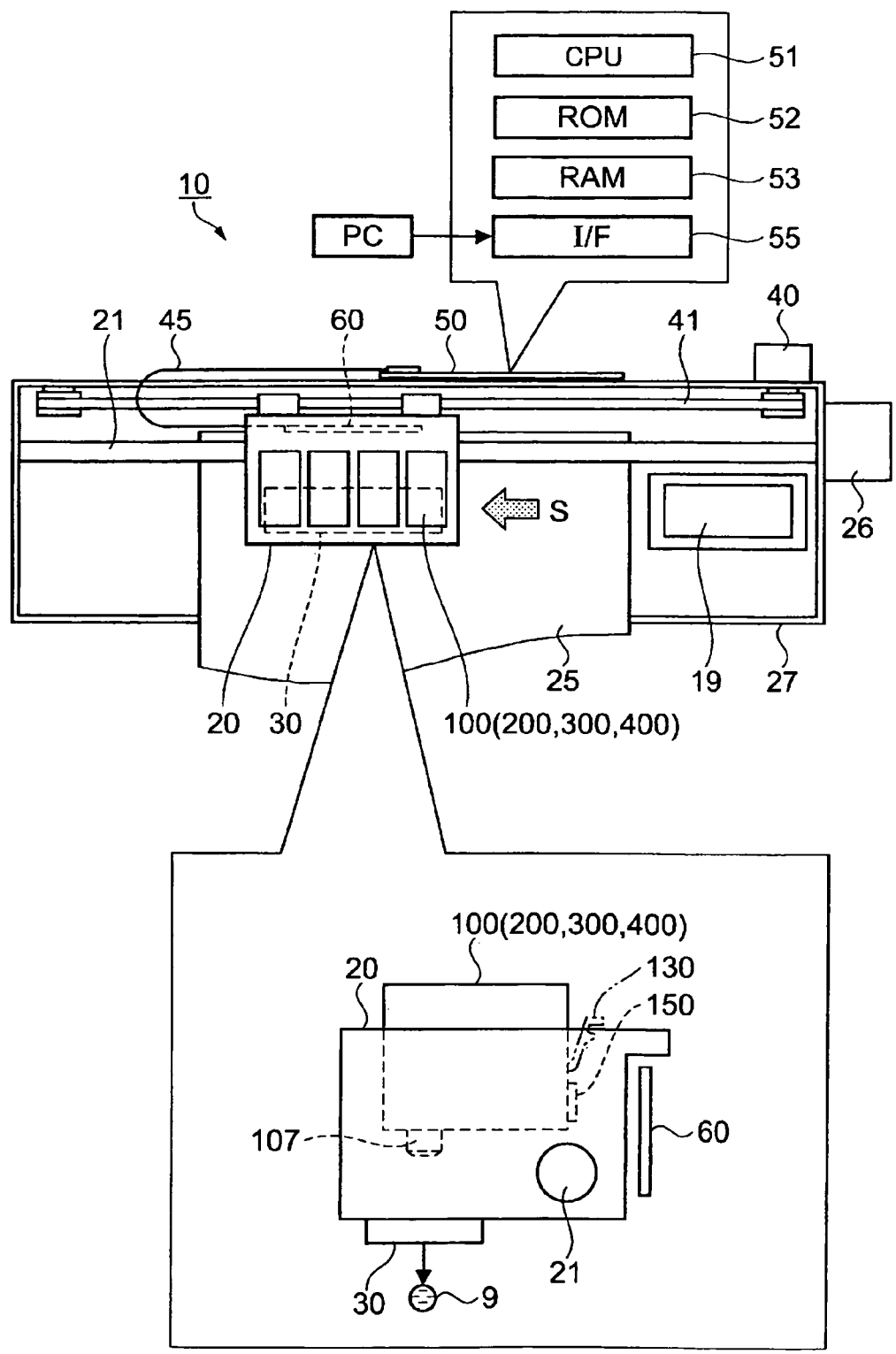
FIG. 8 schematically shows a structure of an inkjet printer 10 according to the second embodiment.

FIG. 8 shows a schematic structure of an inkjet printer 10 according to the second embodiment. A cleaning box 19 carries out a cleaning treatment. The cleaning treatment is a processing for cleaning an ink flow path. More specifically, the cleaning treatment is a treatment for discharging bubbles and a thickened ink which stay near a nozzle or in an ink flow path formed in a jet head 30, by jetting an ink, or a treatment for suctioning such bubbles and thickened ink by vacuum drawing. A carriage 20 is moved to the position of the cleaning box 19 at a predetermining timing, and a cleaning treatment is carried out. Control of a cleaning treatment is performed by a circuit on a sub board 60 and a main board 50.

Figure 9A:
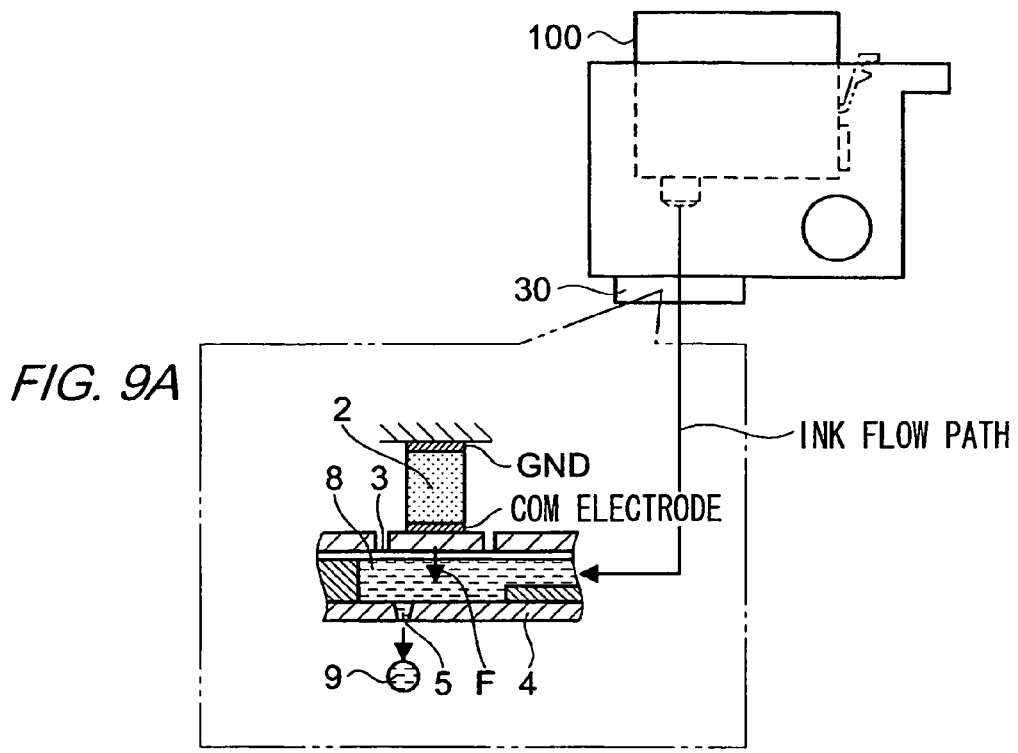
FIG. 9A illustrates a pressure generation mechanism of a nozzle.
Figure 9B:
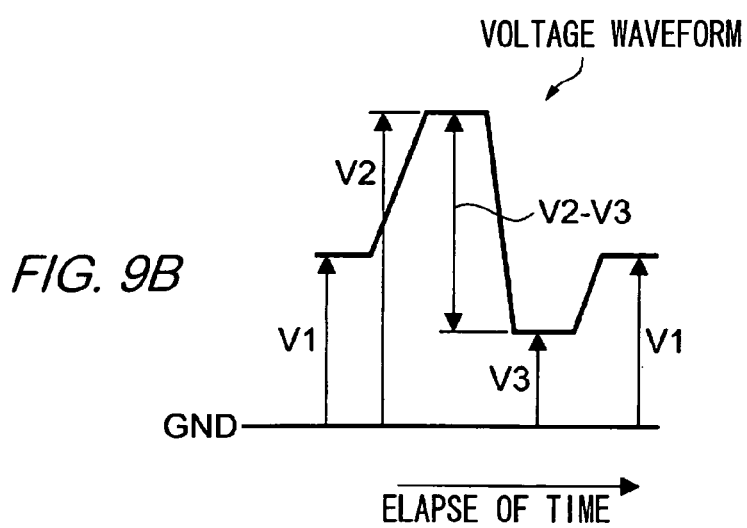
FIG. 9B is a graph explaining the pressure generation mechanism of the nozzle.

FIGS. 9A and 9B illustrate a pressure generation mechanism of a nozzle. The pressure generation mechanism is provided for each of the nozzles. The pressure generation mechanism applies a pressure to an ink in a jet head. Under the pressure, a predetermined amount of ink is jetted as an ink drop through the nozzle.

FIG. 9A schematically shows the pressure generation mechanism constructed in the jet head 30. The pressure generation mechanism includes a piezoelectric element 2 as a driver (actuator). The piezoelectric element 2 has electrostrictivity that the piezoelectric element 2 contracts or expands to deform depending on a voltage applied between a Com electrode and a GND electrode provided respectively at two ends of the piezoelectric element 2. A pressure chamber 8 is a space for applying a pressure to an ink, and is formed in a middle of an ink flow path. The pressure chamber 8 is internally filled with an ink. The pressed ink is jetted as an ink drop 39 through a nozzle 5 provided in a bottom member 4 of the jet head 30.

FIG. 9B shows an example of a voltage waveform applied to the piezoelectric element 2. Jetting of an ink carried out by the pressure generation mechanism will now be specifically described based on the voltage waveform shown in FIG. 9B. At first, a voltage V1 is applied to the Com electrode, and the piezoelectric element 2 accordingly contracts by a predetermined amount. That is, this state ends before printing starts. That is, this state is a reference position for an operation of the piezoelectric element 2 when jetting an ink. Next, the applied voltage increases from V1 to V2, and the piezoelectric element 2 accordingly contracts by a greater extent. At this time, a meniscus (of the liquid surface) formed in the nozzle prevents air from entering in through the nozzle 5. On the other hand, contraction of the piezoelectric element 2 causes the ink to flow and be supplied from the ink cartridge through the ink flow path. The supplied ink is drawn into the pressure chamber 8. Next, the applied voltage decreases from V2 to V3, and the piezoelectric element 2 expands accordingly. This expansion presses down a member 3 forming a wall surface of the pressure chamber 8, in a direction of an arrow F (toward the lower side of the figure), so that the ink in the pressure chamber 8 is pressed. As a result, the ink is jetted as an ink drop 39 from the nozzle 5. Thereafter, a voltage V1 is applied again to the piezoelectric element 2. The piezoelectric element 2 then goes back into the state of the reference position to be ready for a next jetting.

In this manner, a voltage waveform shown in FIG. 9B is applied to the piezoelectric element 2, and jetting is carried out at one time. As the voltage waveform shown in FIG. 9B is applied plural times, jetting of an ink drop is also carried out plural times. Thus, an ink drop of a predetermined amount is jetted onto a printing paper sheet 25 from the nozzle 5, and an image is printed in accordance with print data. The operation of jetting an ink drop of a predetermined amount in this manner is referred to as a "jetting operation".

Figure 10:
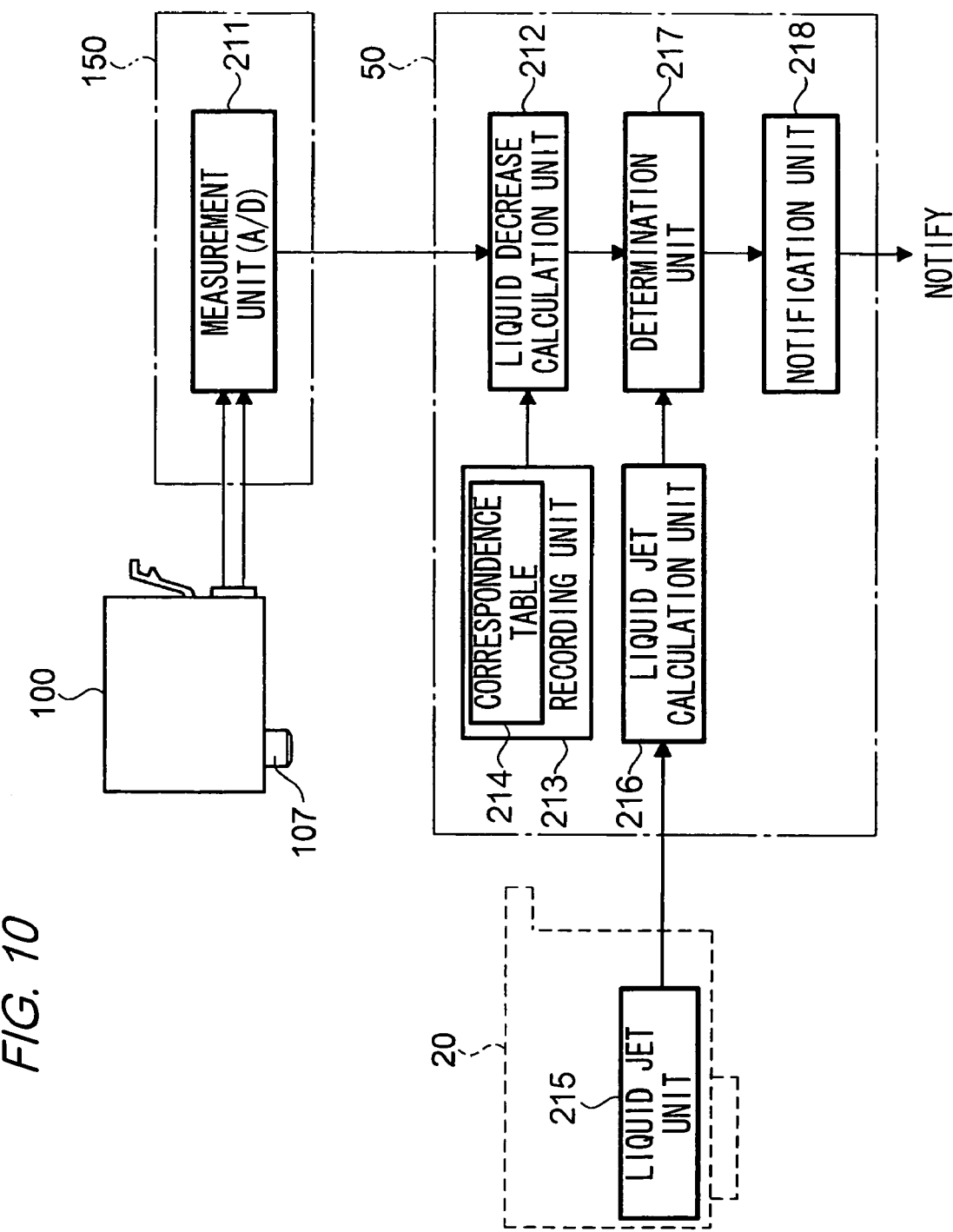
FIG. 10 is a functional block diagram of a jet state detection device according to the second embodiment.

FIG. 10 is a functional block diagram of a jet state detection device according to the second embodiment. In this embodiment, the CPU 51 as shown in FIG. 8 executes a processing program stored in the ROM 52, by using the RAM 53 as a working area. The jet state detection device includes a measurement unit 211, a liquid decrease calculation unit 212, a recording unit 213, a liquid jet amount calculation unit 216, a determination unit 217, and a notification unit 218. Among these units, the measurement unit 211 is installed on the circuit board 150, and the other units are installed on the main board 50. Individual ones of these units perform processings as follows.

The measurement unit 211 measures an electromotive force generated between two electrodes provided in an ink cartridge 100. The recording unit 213 records a correspondence table 214 which defines a relationship between electromotive forces and remaining ink amounts, for each ink cartridge. The liquid decrease calculation unit 212 calculates a decrease of the ink in the ink cartridge 100 from the measured electromotive force, by referring to the correspondence table 214. The liquid jet amount calculation unit 216 calculates an ink jet amount of an ink to be jetted by a jetting operation of the liquid jet unit 215 constructed in the carriage 20. The determination unit 217 determines whether a ratio between the decrease of the ink calculated by the liquid decrease calculation unit 212 and the ink jet amount calculated by the ink jet amount calculation unit 216 is a value within a predetermined range or not. The notification unit 218 provides a notification about a jet state, based on a determination result.

In the second embodiment, the ROM 52 corresponds to the recording unit 213. The liquid jet unit 215 is a means for jetting an ink contained in the ink cartridge 100 to a printing paper sheet 25, and includes the pressure generation mechanism described above and an ink flow path between the supply port 107 and the nozzle 5, which are respectively installed before and behind the pressure generation mechanism.

2-2. Operation

Figure 11:
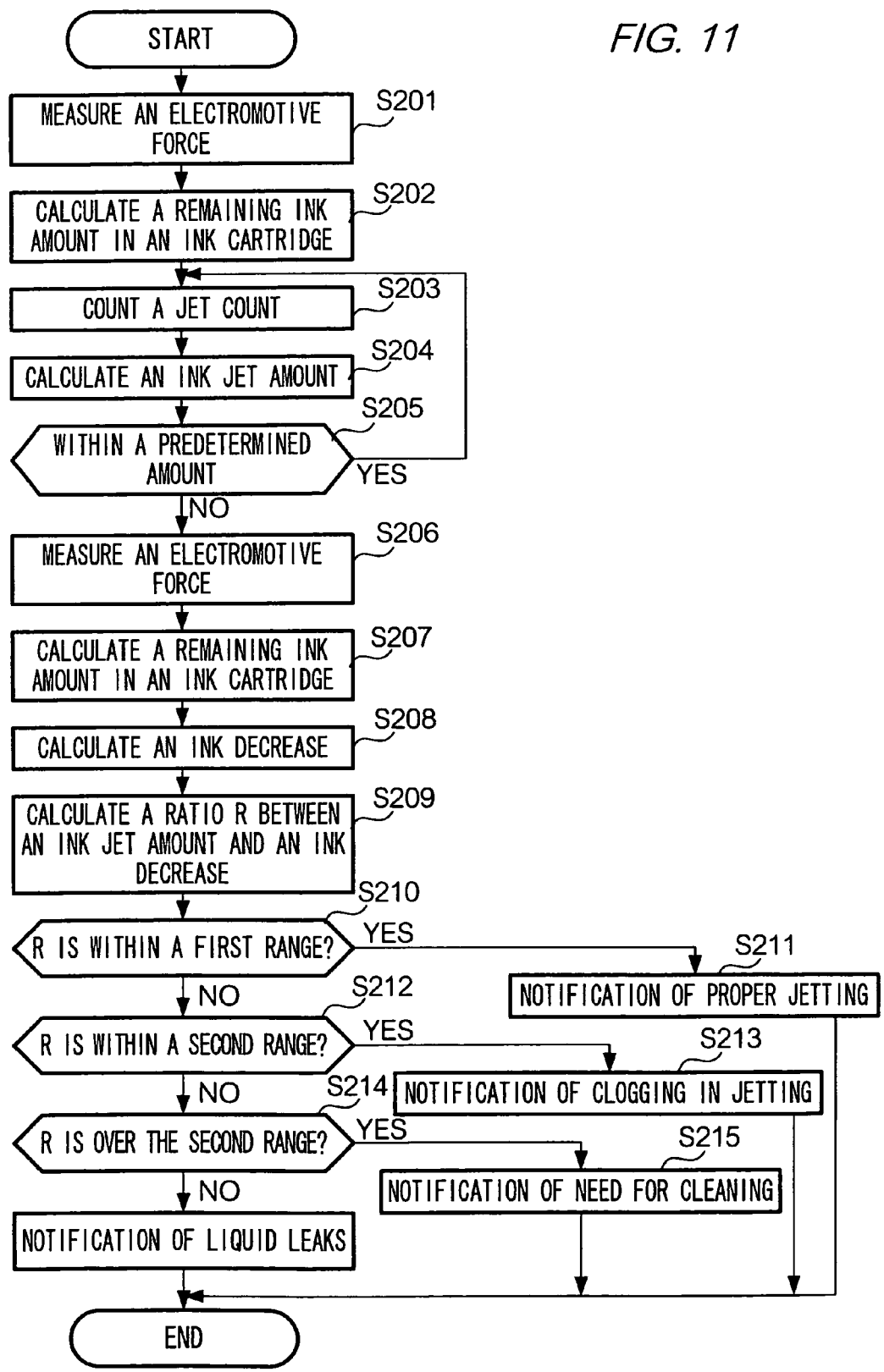
FIG. 11 is a flowchart showing an operation of the jet state detection device.

FIG. 11 is a flowchart showing an operation of the jet state detection device. Processings in this flow are automatically started each time a user of an inkjet printer 10 manipulates a predetermined manipulation button not shown or each time printing is started. Descriptions of an example in which detection of a jet state is carried out for the ink cartridge 100 will be made as follows. For each of the other ink cartridges, a jet state is detected in the same manner as in the example.

In a step S201, the CPU 51 measures an electromotive force generated between two electrodes, for the ink cartridge 100. More specifically, a measurement is carried out as follows. The CPU 51 controls a measurement circuit (not shown) provided on the circuit board 150, and measures an electromotive force. The measurement circuit has a function to convert a voltage value as analog data, which is generated between the two electrodes, into digital data. Owing to this configuration, a distance of a lead wire by which the electromotive force generated in the ink cartridge is led directly as analog data is shortened. Accordingly, a voltage drop caused by the lead wire is suppressed so that the generated electromotive force can be measured more correctly.

In a step S202, the CPU 51 calculates a remaining ink amount in the ink cartridge by using the measured electromotive force and a correspondence table stored in the ROM 52. In this example, the correspondence table is prestored in the ROM 52.

In the step S202, the CPU 51 reads individual information from an IC chip provided on the circuit board 150 of the ink cartridge, and specifies the ink cartridge on the basis of the individual information. The CPU 51 reads a correspondence table which is appropriate to the specified ink cartridge, and calculates a remaining ink amount. In this example, the correspondence table includes a numerical expression which expresses a function between the electromotive force and the remaining ink amount. Accordingly, in the step S202, the CPU 51 calculates a remaining ink amount relative to a measured electromotive force, by using the numerical expression.

In a step S203, the CPU 51 measures a number of times (hereinafter a "jet count") the liquid jet unit has jetted an ink drop after the processing for measuring an electromotive force in the step S201. In this example, the CPU 51 counts the jet count by measuring waves of the voltage shape which is applied to the piezoelectric element 2 in the pressure generation mechanism described previously. In a step S204, the CPU 51 calculates an ink jet amount. Depending on the voltage waveform applied to the piezoelectric element 2, the CPU 51 multiplies an ink amount of one ink drop jetted from a nozzle by the jet count, thereby to calculate an ink jet amount. In this example, the ink amount of one ink drop is constant, and is recorded in advance on the ROM 52. As an alternative, the ink amount of an ink jetted from a nozzle may vary depending on voltage waveforms. In this case, the CPU 51 measures jet counts respectively for the voltage waveforms, and multiplies the measured jet counts respectively by ink jet amounts corresponding to the waveforms, to calculate an ink jet amount.

In a step S205, the CPU 51 determines whether a calculated ink jet amount is within a predetermined amount or not. A threshold which defines the predetermined amount is prestored in the ROM 52. If the calculated jet amount is determined to be within the predetermined amount (step S205: YES), the CPU 51 shifts the processing flow to the step S203 again. The CPU 51 further continues counting the jet count, to calculate an accumulated ink jet amount of the ink. In this example, the threshold indicating the predetermined amount is a value equivalent to the smallest decrease of an ink which can cause the electromotive force to bring about a distinct change (reduction) in the electromotive force generated in the liquid container. By adopting such a value as a threshold, a jet state of the ink can be detected accurately at high frequency. The predetermined amount is not limited to such a value. For example, the predetermined amount may be an ink jet amount equivalent to an ink amount which is consumed for printing a predetermined number of printing paper sheets. In brief, the predetermined amount may be any amount insofar as a jet state of an ink can be detected accurately at suitable frequency.

If the ink jet amount exceeds the predetermined amount (step S205: NO), the CPU 51 measures an electromotive force in a step S206. In this example, the CPU 51 measures the electromotive force in the same manner as in the step S201.

In the step S207, the CPU 51 calculates a remaining ink amount in the ink cartridge by using a measured electromotive force and a correspondence table. The CPU 51 calculates a remaining ink amount in the same manner as in the step S202.

In a step S208, the CPU 51 calculates a decrease of the ink contained in the ink cartridge 100. The CPU 51 calculates a decrease of the ink by subtracting the remaining ink amount calculated in the step S208 from the remaining ink amount calculated in the step S202.

In a step S209, the CPU 51 calculates a ratio R between an ink jet amount (more specifically, an ink jet amount based on a calculation) and a decrease of the ink (more specifically, a decrease of an ink based on a calculation). In this example, the CPU 51 calculates the ratio R by dividing the ink jet amount calculated in the step S204 by the decrease of the ink calculated in the step S208. To facilitate understanding of processings in a next step S210 and subsequent steps, the "ratio R between an ink jet amount and a decrease of an ink" will now be supplementarily described below.

Figures 12, 15:
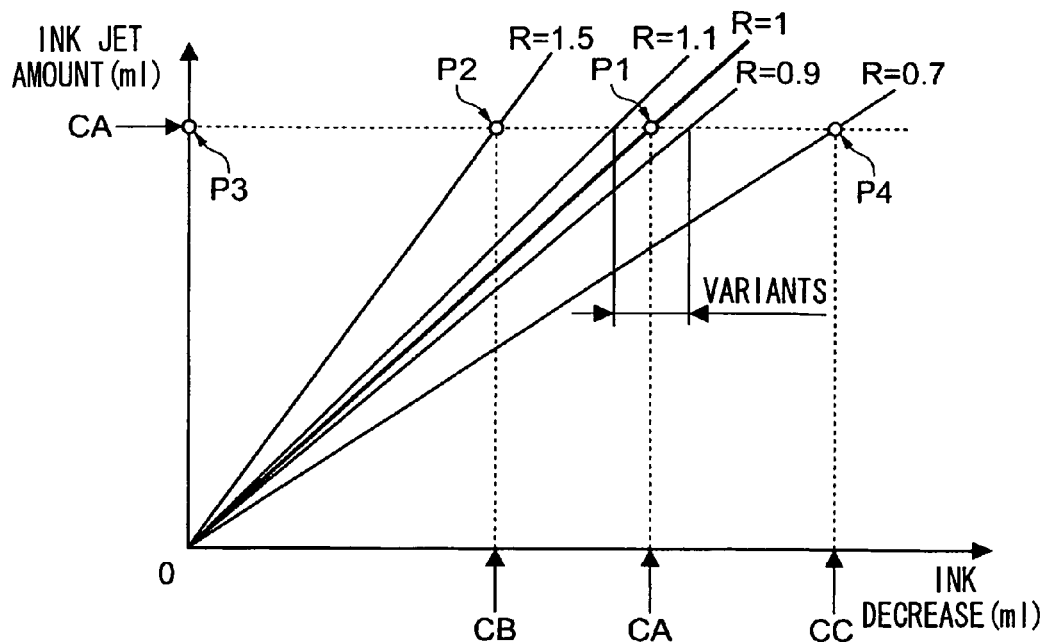
FIG. 12 is a graph showing relationships between ink decreases and ink jet amounts.
FIG. 15 shows an example of a correspondence table according to the third embodiment.

FIG. 12 is a graph showing relationships between decreases of an ink and ink jet amounts. The horizontal axis represents a decrease of an ink and the vertical axis represents an ink jet amount. The inclination of each line corresponds to the ratio R between the decrease of the ink and the ink jet amount (=ink jet amount/ink decrease). If an ink is jetted ideally and if a calculated ink jet amount is equal to a measured decrease of the ink, the ink jet amount and the decrease of the ink are both CA, as indicated at the point P1 in the figure, and the ratio R=1 is given. However, this shows only an ideal state. If the printer should operate properly, a calculated ink jet amount (i.e., a calculated volume of one drop of an ink) is not perfectly equal to a measured decrease of the ink. For example, with respect to a piezoelectric element as described previously, variants of an electromechanical coupling coefficient indicating electrostrictivity, and variants of a nozzle shape, or variants of a composition of an ink cause variants of the ratio between an ink jet amount and a decrease of an ink. If an amount of an ink which is actually jetted is larger than a calculated ink jet amount, i.e., if a decrease of the ink is larger, the ratio R decreases to, for example, R=0.9. On the other hand, if an actually jetted amount of an ink drop is smaller than a calculated ink jet amount, i.e., if a decrease of the ink is smaller, the ratio R increases, for example, to R=1.1. In this manner, even if the inkjet printer operates properly, the ratio R has a predetermined range of variants. For example, if the ratio R falls within a predetermined range including R=1.0, such as a range of $0.9 \leqq R \leqq 1.1$ (a proper range), an ink can be determined as being properly jetted.

For example, the nozzle may slightly clog so that a measured decrease of an ink becomes relatively small relative to a calculated ink jet amount. In this case, the ink jet amount is CA as indicated at a point 2 in the figure, and the decrease of the ink is CB (<CA) in relation to the ink jet amount CA. At this time, the ratio R is greater than 1. Thus, if R falls within a predetermined range which is greater than 1, such as a range of $1.1 < R \leq 1.5$, the ratio R indicates that an ink is jetted with the nozzle clogged slightly or more.

If the nozzle completely clogs, a calculated ink jet amount is CA as indicated at a point P3 in the figure, and a decrease of the ink is "0" in relation to the calculated ink jet amount CA. At this time, the ratio R is infinite. That is, the more the ink clogs the nozzle, the greater the ratio R is. Hence, if R falls within a predetermined range greater than 1 such as a range of $R > 1.5$, the ratio R implies a state in which the ink clogs the nozzle more, i.e., a state that a cleaning is required.

On the contrary, if a decrease of the ink is CC ($> CA$) in relation to an ink jet amount CA as indicated at a point P4 in the figure, the ratio $R = 0.7$ is given and so exceeds a proper range in a descendent direction. A low ratio R implies that the ink is consumed not only by jetting from a nozzle but also due to any other reason, e.g., the ink leaks from the ink flow path. Thus, a ratio R within a predetermined range smaller than 1 such as a range of $R < 0.9$ implies that the ink leaks.

As described above, an ink jet state from the nozzle can be detected by utilizing "a ratio R between a calculated ink jet amount and a measured decrease of an ink". In this example, the CPU 51 divides an ink jet amount calculated in the step S202 by a decrease of the ink calculated in the step S208. Inversely, the ratio R may be calculated by dividing the decrease of the ink calculated in the step S208 by an ink jet amount calculated in the step S204. In this case, in the relationships of ink jet states relative to values of the ratio R, the relationships in size of the ratio R is inverse to those of states shown in FIG. 12.

Referring to FIG. 11 again, the CPU 51 determines whether a calculated ratio R is within a first range or not. The "first range" is a proper range which has been described with reference to FIG. 12, i.e., the range of $0.9 \leq R \leq 1.1$. The first range is set depending on performance of the liquid jet unit installed in the inkjet printer. Information indicating the first range is prestored in the ROM 52. The CPU 51 reads the first range from the ROM 52, and compares the first range with the ratio R, to determine whether the ratio R is within the first range or not.

If the ratio R is determined to be within the first range (step S210: YES), the CPU 51 gives notification that jetting is performed properly, in a step S211. Otherwise, if the ratio R is not determined to be within the first range (step S210: NO), the CPU 51 shifts the processing flow to a step S212.

In the step S212, the CPU 51 determines whether the calculated ratio R is within a second range or not. The "second range" is a range of $1.1 < r \leq 1.5$. The second range is set depending on performance of the liquid jet unit installed in the inkjet printer, in the same manner as in a case of the first range. Information indicating the second range is prestored in the ROM 52. The CPU 51 reads the second range from the ROM 52, and compares the second range with the calculated ratio R, to determine whether the ratio R is within the second range or not.

If the ratio R is determined to be within the second range (step S212: YES), the CPU 51 gives notification that clogging slightly hinders jetting, in a step S213. Otherwise, if the ratio R is not determined to be within the second range (step S212: NO), the CPU 51 shifts the processing to a step S214.

In the step S214, the CPU 51 determines whether the calculated ratio R is greater than the second range or not, i.e., whether or not the ratio R is within a range of $R > 1.5$ (third range) in which the ratio R is greater than the second range. If the ratio R is determined to be within the third range of $R > 1.5$ (step S214: YES), the nozzle clogs to such an extent that requires cleaning, as described with reference to FIG. 12. Accordingly, the CPU 51 gives notification that cleaning is required, in a step S215. Otherwise, if the ratio R is not determined to be within the third range of $R > 1.5$ (step S214: NO), e.g., $R < 0.9$ is given in this example, the ratio R is considered to be equivalent to a state that an ink leaks from an ink flow path. Accordingly, the CPU 51 gives notification that a liquid leaks, in a step S216. As described above, the CPU 51 notifies the user of information depending on the value of the calculated ratio R, and terminates the processing flow shown in FIG. 11.

Notification of information is achieved by displaying a predetermined sentence on a liquid crystal display panel not shown but provided for the inkjet printer 10. More specifically, the CPU 51 selects one of sentences prestored in the ROM 52, depending on the ratio R, and controls the liquid crystal display panel to show the selected sentence. For example, in the processing in the step S211, a sentence saying "Ink is properly jetted" is displayed. As another example, in the processing in the step S215, a displayed sentence is "Ink clogs. Cleaning is needed immediately". Through notification which is given in this manner, the user of the inkjet printer 10 can easily check whether or not an ink contained in an ink cartridge attached to a carriage is jetted properly from a nozzle.

As has been described above, the jet state detection device according to the second embodiment is capable of detecting a jet state indicating how an ink is jetted, by measuring an electromotive force which is generated in an ink cartridge. Abnormality occurring in a jet state of the ink can be detected, for example, in a case that a thickened ink hinders the flow of an ink through an ink flow path and causes a state in which the ink does not flow smoothly, as a result. According to the second embodiment, there is no need of additionally providing any special detection element in a jet head, and therefore, no space needs to be maintained in order to put a detection element in the jet head. Accordingly, the ink flow path is not affected by limitations concerning a detection element. Since no circuit is needed to drive a detection element, cost-up can be prevented. Thus, the jet state detection device according to the second embodiment is particularly suitable for an inkjet printer which aims at downsizing and/or price reduction.

2-3. Modifications

The second embodiment has been described above. The invention is not limited to the second embodiment but can be practiced in variously modified forms, which will now be described below referring to examples of modifications. Two or more of the modifications described below may be combined with each other when used.

Timings for detecting a jet state are not limited to those described in the second embodiment. In the second embodiment, a jet state is detected each time an accumulated ink jet amount obtained by calculations reaches a predetermined amount. In addition to this timing, for example, a jet state may be detected on the basis of a decrease of an ink between start of printing and end of printing for a set of print data. This configuration may involve a risk that frequency of detecting a jet state lowers. However, since a jet state is detected one time for one set of print data, the processing for monitoring whether an ink jet amount has reached a predetermined amount or not is not required any more (the processing in the step S205 in FIG. 11). That is, processing load caused by detection of a jet state is reduced.

Also in the second embodiment, a jet state is detected at a time point when a calculated ink jet amount reaches a predetermined amount, and then, the jet state detection processing is terminated, as has been described with reference to the flowchart of FIG. 11. However, if printing is continuously carried out thereafter, the jet state detection processing is started again after detecting a jet state once. With this configuration, even if a jet state of an ink changes during printing, a jet state is detected repeatedly. Accordingly, an abnormal jet state can be detected with improved provability.

Ranges of the ratio R which are used to determine a jet state depending on the ratio R are not limited to those described in the second embodiment described above. In the second embodiment, two ranges of first and second ranges are used, as has been described with reference to the flowchart of FIG. 11. However, more ranges than the two ranges may be used. According to this configuration, a jet state of an ink can be detected, classified into finely fractionalized ranges. In this case, responses to be made can also be fractionalized depending on fractionalized jet states. Accordingly, an optimum action can be made in response to each jet state.

Alternatively, the ratio R may be compared with only one range in place of plural ranges. In this case, for example, a cleaning treatment is carried out whenever any other state than a proper ink jet state is detected. In this manner, a stable image can be steadily printed. With this configuration, processing load caused by detection of a jet state can be reduced.

The hardware structure of the inkjet printer is not limited to that described in the second embodiment. In the second embodiment, the measurement unit 211 is provided on the circuit board 150, as shown in FIG. 10. However, the measurement unit 211 may alternatively be provided on the main board 50. Otherwise, the measurement unit 211 may be provided on the sub board 60. In the second embodiment, the measurement unit is provided on the circuit board 150 in order to suppress a voltage drop of an electromotive force generated in an ink cartridge and to correctly measure the generated electromotive force. However, there is a case that a generated electromotive force is sufficiently large relative to a voltage drop, and accordingly, influence from the voltage drop is relatively small. Particularly in this case, the measurement unit 211 need not be provided on the circuit board 150.

Also in the second embodiment described above, a correspondence table is recorded in advance in the ROM 52. The correspondence table may be updated, triggered by a predetermined event. For example, a correspondence table together with print data and/or other data (such as version-up data of a printer driver for the inkjet printer) may be supplied from a PC each time the data supplied. In this case, the correspondence table is extracted from the data and is then stored into the RAM 53. In this manner, the correspondence table can be updated to a newest version. In this case, the RAM 53 serves as the recording unit 213.

Further, the second embodiment described above adopts a scheme of using the piezoelectric element 2 as a driver in the method for jetting an ink drop. In place of this scheme, a so-called thermal scheme of jetting an ink drop by using a heat generation member as a driver may be used.

3. Third Embodiment

Next, a third embodiment of the invention will be described. In the third embodiment, an example of detecting a type of liquid as a liquid property will be described. The liquid property detection device according to the third embodiment will be referred to as a "liquid identification device". From descriptions made below, matters common to the first embodiment will be omitted. Components common to the first embodiment will be denoted at common reference symbols.

3-1. Structure

A liquid jet device which incorporates a liquid identification device according to the second embodiment has the same structure as shown in FIG. 1. The liquid identification device identifies whether an ink contained in an attached ink cartridge 100 has a desirable composition or not, depending on an electromotive force generated in the ink cartridge.

FIG. 13 is a functional block diagram of the liquid identification device. In this embodiment, the CPU 51 performs functions shown in FIG. 13 by executing a processing program stored in the ROM 52 while using the RAM 53 for working. The liquid identification device functions as a measurement unit 311, a recording unit 312, an identification unit 314, a notification unit 315, and a detection unit 317. In this embodiment, the measurement unit 311 is installed on a circuit board 150, and the other units are installed on a main board 50. Individual ones of these units mainly perform processings as follows.

The detection unit 317 obtains liquid amount information from a liquid amount information recording unit 316a provided on the circuit board 150. In this embodiment, the IC chip described previously corresponds to the liquid amount information recording unit, and data concerning a remaining amount of an ink is the liquid amount information. At a predetermined timing, e.g., when the detection unit 317 detects that the liquid amount is full, the measurement unit 311 analog-to-digital-converts (or A/D converts) an electromotive force (analog data) generated between two electrodes into digital data, and outputs the converted digital data to the recording unit 312. The recording unit 312 is input with the digital data, and records the input digital data on a predetermined area in the RAM 53. The storage unit 313 stores a correspondence table which describes correspondences between ink types and electromotive forces, from individual information data specific to the ink cartridge, which is supplied from a PC. The identification unit 314 identifies an ink type of the ink contained in the ink cartridge, by using a measured electromotive force and the correspondence table. The notification unit 315 gives notification of the identified ink type.

Figure 14:
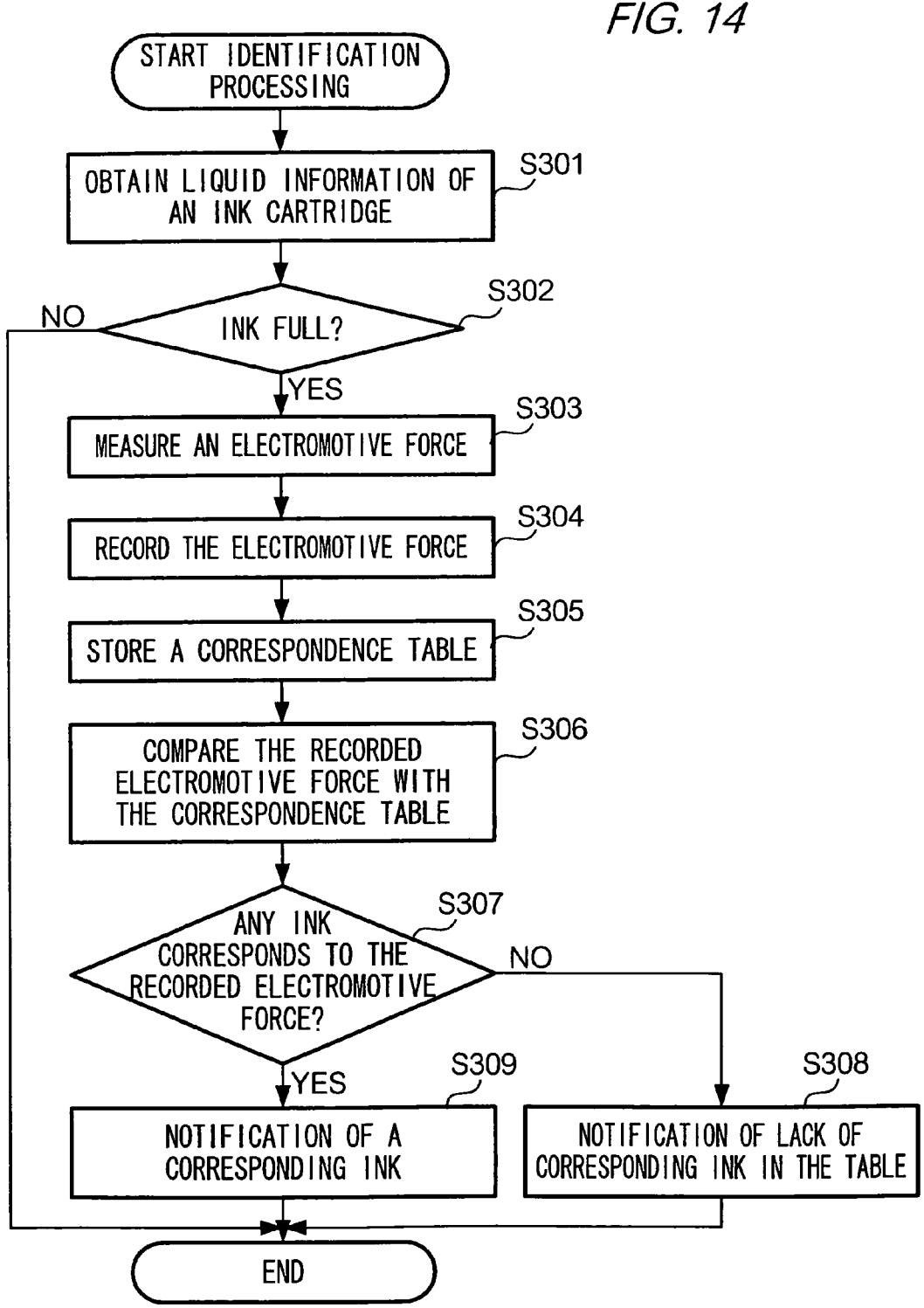
FIG. 14 is a flowchart showing an operation of the liquid identification device.

FIG. 14 is a flowchart showing an operation of the liquid identification device. The identification processing shown in FIG. 14 starts, for example, when a user of the inkjet printer 10 manipulates a predetermined manipulation button not shown to input a processing command, when any of ink cartridges 100 to 400 is attached to a carriage 20, or when a power supply of the inkjet printer 10 is turned on. The following descriptions will be made referring to an example of executing processings with respect to the ink cartridge 100. The processings as described below are also carried out for each of the other cartridges.

In a step S301, the CPU 51 obtains liquid amount information of the ink cartridge 100. More specifically, the CPU 51 obtains data concerning a remaining amount of the ink in the ink cartridge 100 by reading recorded individual information from an IC chip provided on the circuit board 150.

In a step S302, the CPU 51 determines whether the ink contained in the cartridge 100 is full or not, from data concerning a remaining ink amount. If not full (step S302: NO), the CPU 51 terminates the processing flow shown in FIG. 14. As has been described in the second embodiment, the remaining ink amount is calculated, for example, based on a jet count of an ink drop jetted from a nozzle. If the ink is not full, i.e., if the remaining ink amount is smaller than 100%, there can be a case that a calculated remaining ink amount obtained from recorded information of the ink cartridge 100 differs from an amount of the ink actually remaining in the ink cartridge 100. In this case, a measured electromotive force varies depending on an actual remaining ink amount. Therefore, in this example, ink identification accuracy based on the measured electromotive force deteriorates; the processing flow is terminated without executing an identification processing. In this case, neither the processing in steps S301 nor S302 is required, as also the function of the detection unit 317 is not required, in FIG. 13.

If the ink is determined to be full (step S302: YES), the CPU 51 measures an electromotive force of the ink cartridge 100 in a step S303. If the ink is full, a calculated remaining ink amount obtained from recorded information of the ink cartridge 100 and an ink amount actually remaining in the ink cartridge 100 are substantially the same each other. Therefore, a generated electromotive force does not substantially depend on the remaining ink amount but depends on the type of the ink.

In a step S304, the CPU 51 records the measured electromotive force. The CPU 51 stores, into a predetermined recording area in the RAM 53, a voltage value which has been subjected to digital conversion by a measurement circuit.

In a step S305, the CPU 51 stores a correspondence table. In this example, each time a print job is supplied from a PC, a correspondence table describing newest data is supplied from the PC together with the print job. Each time a newest correspondence table is supplied, the CPU 51 stores digital data describing the newest correspondence table into the RAM 53, thereby to update a current correspondence table.

FIG. 15 shows an example of a correspondence table according to the third embodiment. The correspondence table includes plural data sets respectively containing data items of "ink type", "color", "lot number", "ink composition", and "electromotive force". The data items are associated with each other. For example, the correspondence table shows that an ink of an ink type "ACI" is associated with a color "cyan", one of lot numbers "1" to "3", an ink composition C1, and an electromotive force of VC1.

In a step S306, the CPU 51 compares a measured electromotive force with the correspondence table. More specifically, the CPU 51 reads a measured electromotive force, and compares the measured electromotive force with electromotive forces described in the correspondence table. In a step S307, the CPU 51 determines whether or not there is an ink associated with an electromotive force corresponding to the measured electromotive force. In this example, if a voltage difference between a recorded electromotive force and an electromotive force described in the correspondence table falls within a predetermined tolerable range of measurement errors, the CPU 51 determines that both electromotive forces correspond to each other.

If no ink described in the table is determined to correspond to a recorded electromotive force (step S307: NO), the CPU 51 gives notification that there is no corresponding ink, in the step S308. Otherwise, if an ink is determined to correspond to the recorded electromotive force (step S307: YES), the CPU 51 gives notification about a type of the corresponding ink. If the processing in a step S308 or S309 ends, the CPU 51 terminates the processing flow shown in FIG. 14.

For example, notification of an ink type is given as follows. When an electromotive force corresponds to VM2 in the correspondence table shown in FIG. 15, notification is given saying that the ink type is "BMI". In this example, an ink type is notified by displaying a predetermined sentence on a liquid crystal display panel not shown but provided on the inkjet printer 10. The CPU 51 selects and displays one of the sentences pre-stored in the ROM 52. For example, the CPU 51 performs control to show a sentence "Ink type is BMI (magenta/composition M2)". If an electromotive force corresponds to none of the electromotive forces described in the correspondence table, a sentence indicating that there is no corresponding ink is displayed, e.g., a sentence "Wrong ink is used" is displayed.

According to the third embodiment, the user of the inkjet printer 10 can easily check, by reading a displayed sentence, whether an ink contained in the ink cartridge has a desirable composition or not. Accordingly, the third embodiment raises the possibility of using an ink having a desirable composition, and so, a high-quality image can be formed with high possibility.

The third embodiment has been described above, referring to a practical example. The invention is not limited by the third embodiment but can be practiced in variously modified forms, which will now be described below referring to examples of modifications. Two or more of the modifications below can be combined with each other in practice.

3-1. First Modification

There is a case that a user wants to check whether an ink cartridge attached to a carriage actually contains an ink of a displayed type. At this time, if a label indicating an ink type cannot be visually checked with the ink cartridge attached to the carriage, the ink cartridge needs to be detached from the carriage, which complicates a visual check. Hence, in this modification, whether or not an ink cartridge attached to the carriage is actually an ink cartridge identified by an electromotive force is checked by using data indicating a manufacturing date of an ink cartridge and/or an ink type, which is recorded in an IC chip as described previously.

FIG. 16 is a functional block diagram of a liquid identification device according to the first modification. The CPU 51 establishes a functional structure by executing a processing program stored in the ROM 52 while using the RAM 53 as a working area. In this modification, the liquid identification device includes an information obtaining unit 318 and a correspondence determination unit 319 in addition to the functional units shown in FIG. 13. Individual ones of these functional units perform processings as follows.

The information obtaining unit 318 obtains information concerning a type of an ink which should be contained in an ink cartridge, from a liquid amount information recording unit 316b. In this example, the IC chip as described previously corresponds to a liquid information recording unit. The correspondence determination unit 319 determines whether an ink type identified by the identification unit 314 and an ink type obtained by the information obtaining unit 318 correspond to each other or not. In this modification, the notification unit 315 notifies a correspondence determination result with respect to an ink type. The other functional components basically perform the same processings as described in the third embodiment. Therefore, descriptions of those functional components will be omitted herefrom.

Figure 17:
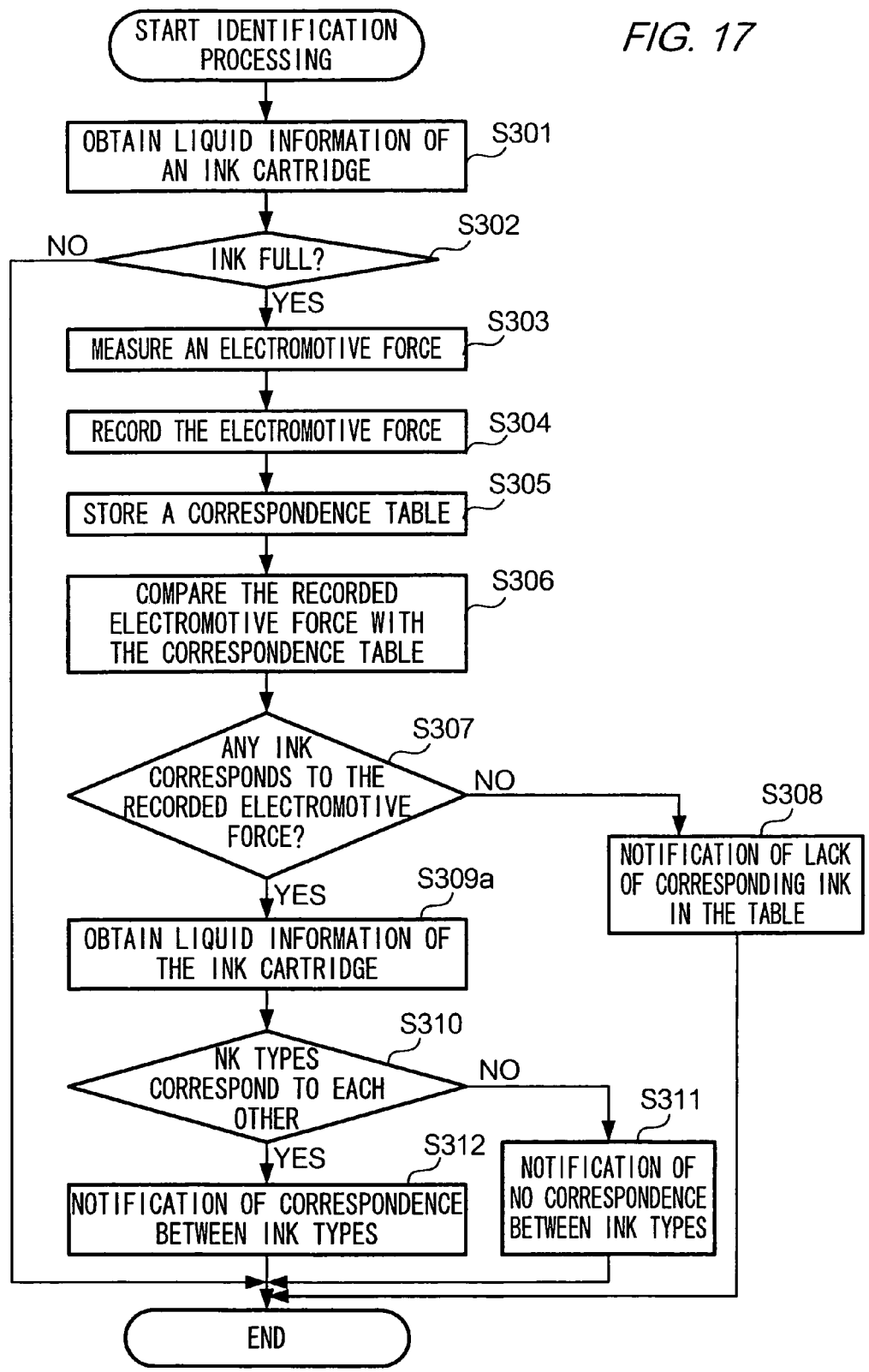
FIG. 17 is a flowchart showing an operation of a liquid identification device according to the first modification of the third embodiment.

FIG. 17 is a flowchart showing an operation of a liquid identification device according to a first modification. In this modification, steps S301 to S308 are the same as processing steps in the third embodiment (see FIG. 14). Therefore, descriptions of these steps will be omitted herefrom, and processings subsequent to the step S309a will be described below.

In a step S309a, the CPU 51 obtains liquid information of an ink cartridge. The CPU 51 reads information concerning a recorded ink type, and obtains the type of an ink to be contained in the ink cartridge 100.

In a step S310, the CPU 51 determines whether ink types correspond to each other or not. That is, the CPU 51 determines whether the information recorded in the IC chip corresponds to an ink type associated with a measured electromotive force or not. The measured electromotive force is compared with a correspondence table, and an ink type is specified. The CPU 51 determines correspondence between ink types in this manner.

If ink types are not determined to correspond to each other (step S310: NO), the CPU 51 gives notification that the ink types do not correspond to each other. If ink types are not determined to correspond to each other (step S310: YES), the CPU 51 gives notification that ink types correspond to each other. After the processing in a step S311 or S312 is carried out, the CPU 51 terminates the processing flow shown in FIG. 17.

Notification of an ink type in the step S311 and S312 is carried out in the same manner as processings described above in the embodiment. For example, if an ink type indicated by information recorded on the IC chip and an ink type indicated by a measured electromotive force do not correspond to each other, a sentence "Ink is not applicable". If both of the ink types correspond to each other, a sentence "Ink is applicable" is displayed.

By giving notification in this manner, the user of the inkjet printer 10 can easily check whether or not the ink contained in the ink cartridge attached to the carriage 20 is certainly an ink having a desirable composition. Therefore, according to this modification, a check operation can be carried out without detaching the ink cartridge from the carriage 20. In this manner, an ink cartridge which contains error free ink having a desirable composition can always be used. As a result, a high-quality image can be formed.

3-2. Other Modifications

Further, in the third embodiment and modifications thereof as described above, a resistance attenuator may be inserted in an ink cartridge in order to adjust a voltage value of an electromotive force. If a difference between compositions of inks cannot cause a significantly identifiable difference between voltage values of electromotive forces generated in an ink cartridge, an electromotive force to be measured can be changed for each of the ink types contained in the ink cartridges. As a result, an ink cartridge which contains an ink having a desirable composition can be correctly identified.

4. Fourth Embodiment

Next, a fourth embodiment of the invention will be described below. Hereinafter, matters common to the first embodiment will be omitted from descriptions made below. Further, components common to the first embodiment will be denoted with common reference symbols.

4-1. Structure

Figure 18:
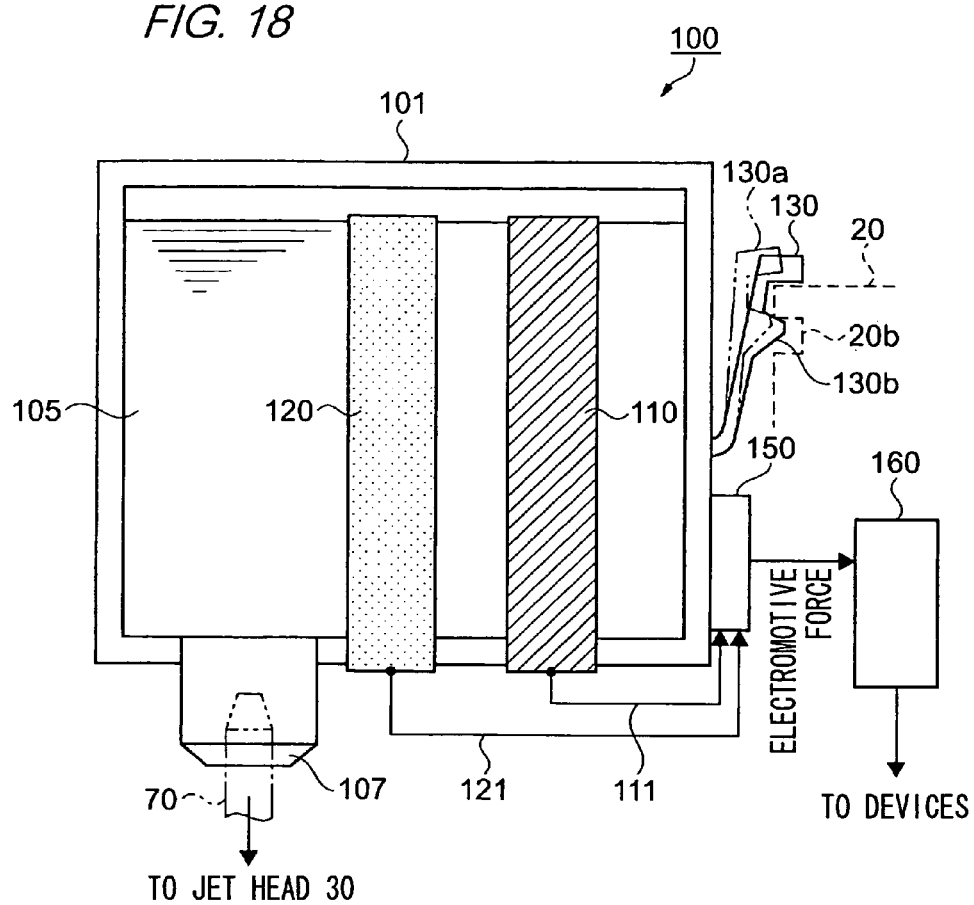
FIG. 18 is a schematic cross-sectional side view of an ink cartridge 100, viewed in a lateral direction.

FIG. 18 is a cross-sectional side view schematically showing an ink cartridge 100. A power supply circuit 160 is a circuit which supplies an electric power for driving circuits constituting the inkjet printer 10. The power supply circuit 160 has a function to generate a predetermined voltage from a commercial power source or to generate a predetermined voltage from a battery power supply such as a rechargeable battery or a dry cell battery. In the fourth embodiment, the inkjet printer 10 uses ink cartridges 100 to 400 as batteries, i.e., a kind of a power supply. That is, the inkjet printer 10 can utilize power supplies other than commercial power supplies, rechargeable batteries, and dry cell batteries. As a result, limitations to operating places or operating time of the inkjet printer 10 are relaxed. In the inkjet printer 10, parts of the structure other than the part of the power supply circuit 160 are the same as those shown in FIG. 1.

An electromotive force which is led to the circuit board 150 is supplied to the sub board 60 through a connecting unit not shown, and is further supplied to the power supply circuit 160 incorporated in the liquid jet device through the main board 50. Further, the power supply circuit 160 converts the supplied electromotive force into a predetermined voltage upon necessity, and supplies the predetermined voltage as an electric power to devices constituting the inkjet printer 10.

Figure 19:
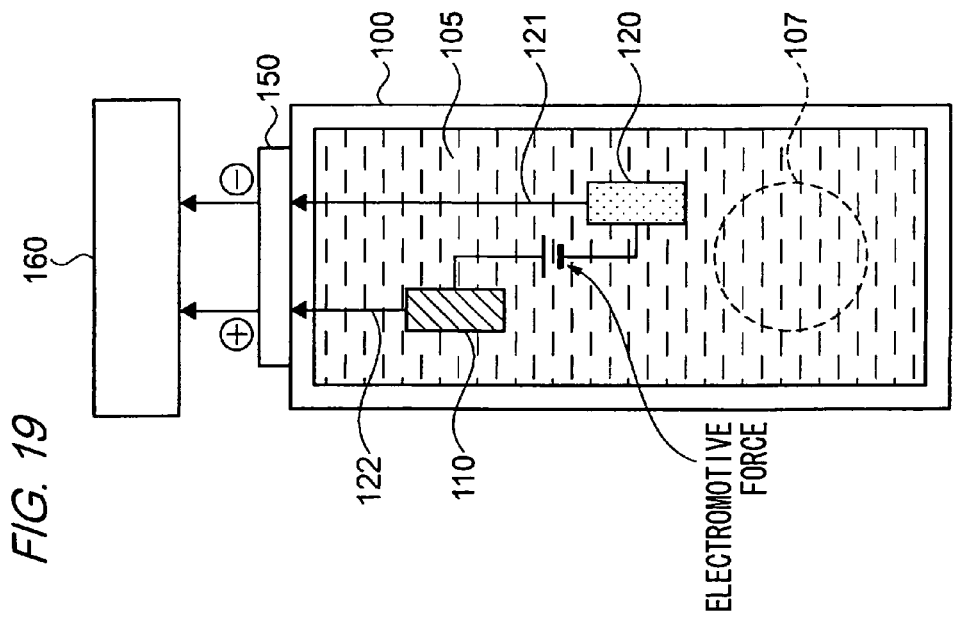
FIG. 19 is a schematic cross-sectional view of the ink cartridge 100, viewed from above.

FIG. 19 schematically shows a cross-sectional structure of the ink cartridge 100, viewed from a top of the ink cartridge 100. An electromotive force generated between electrodes 110 and 120 is supplied to connecting units 122 and 121 and to the power supply circuit 160 through the circuit board 150, with the electrodes 110 and 120 respectively polarized positively and negatively.

As shown in FIGS. 18 and 19, the ink cartridge 100 supplies an ink to the inkjet printer 10 and also serves as a battery. Accordingly, the inkjet printer 10 can use the ink cartridge as a kind of power supply. As a result, when no commercial power supply is available, the ink cartridge can be used as a battery in place of a rechargeable battery or a dry cell battery. Limitations to operating places and operating time can be relaxed.

4-2. Modifications

The fourth embodiment of the invention has been described above. The invention is not limited to the fourth embodiment but can be practiced in variously modified forms, which will be described below. Two or more of the modifications described below can be combined with each other when used.

4-2-1. First Modification

The embodiment described above is configured so that each of the ink cartridges 100 to 400 functions as one battery. Therefore, a voltage supplied to the inkjet printer 10 is equivalent to an electromotive force which is generated in each one of the ink cartridge. A voltaic battery, as is commonly known, ordinarily generates a voltage of about 1 V (volt) by combinations of an electrode material and an electrolyte solution.

In case of using an ink cartridge as a battery, a generated electromotive force is expected to be substantially the same as a voltaic battery. In this case, there is a difficulty in obtaining a voltage of about 3 or 5 V from one ink cartridge. If the inkjet printer 10 needs a voltage of about 3 or 5 V, use of only one ink cartridge as a battery is not enough to obtain a sufficient voltage, and a booster circuit is optionally required.

In the first modification, electrodes in the ink cartridges 100 to 400 are connected so that electromotive forces generated by the ink cartridges are connected in series. In this configuration, a required power supply voltage can be supplied at improved possibility by the electromotive forces generated from the ink cartridges.

Figure 20:
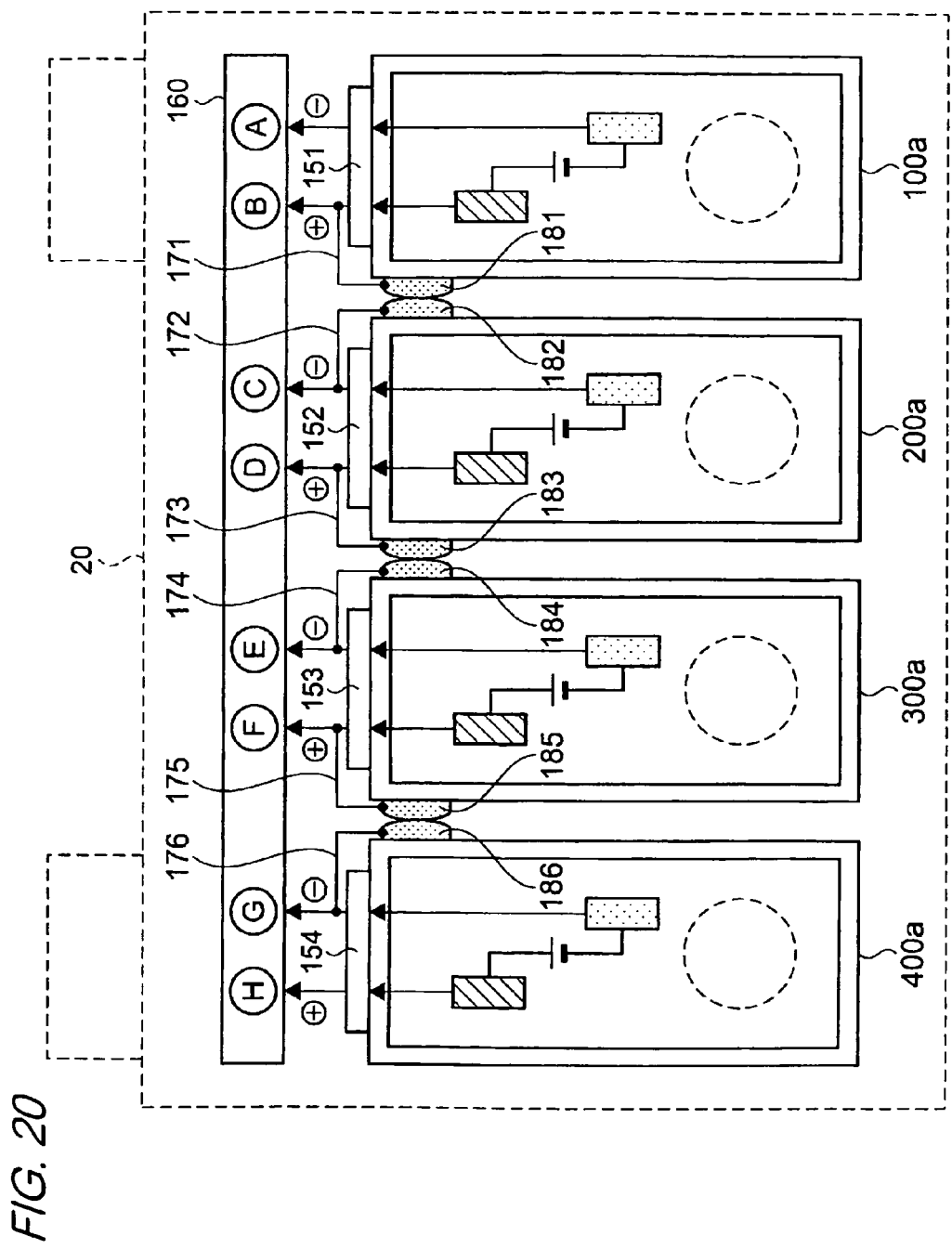
FIG. 20 is a schematic view showing a structure of ink cartridges according to the first modification of the fourth embodiment.

FIG. 20 schematically shows a state in which ink cartridges 100*a* (yellow), 200*a* (magenta), 300*a* (cyan), and 400*a* (black) are attached to a carriage 20. The ink cartridge 100*a* supplies a voltage generated between two electrodes, to the power supply circuit 160 through terminals A and B. On a left side of the ink cartridge 100*a*, there is provided an electrode member 181 connected to a positive pole by a connecting member 171, on a circuit board 151.

The ink cartridge 200*a* adjacent to the ink cartridge 100*a* supplies a voltage generated between two electrodes, to the power supply circuit 160 by terminals C and D. An electrode member 182 connected to a negative pole by a connecting member 172 on a circuit board 152 is provided on a right side of the ink cartridge 200*a* in the figure, which faces the ink cartridge 100*a*. Further, the electrode member 182 is constructed so as to be in contact with the electrode member 181 of the ink cartridge 100*a*. With this configuration, the positive pole of the ink cartridge 100a and the negative pole of the ink cartridge 200a are electrically conducted to each other.

Further, an electrode member 183 connected to a positive pole by a connecting unit 173 on a circuit board 152 is provided on a left side of the ink cartridge 200a The ink cartridge 300a supplies a voltage generated between two electrodes, to the power supply circuit 160 by terminals E and F. An electrode member 184 connected to a negative pole by a connecting member 174 on a circuit board 152 is provided on a right side of the ink cartridge 200a in the figure. Further, the electrode member 184 is configured so as to make contact with the electrode member 183 of the ink cartridge 200a. As a result, the positive pole of the ink cartridge 200a is electrically conduced to a negative pole of the ink cartridge 300a.

Further, an electrode member 185 connected to a positive pole by a connecting member 175 on a circuit board 153 is provided on a left side of the ink cartridge 300a in the figure.

The ink cartridge 400a supplies a voltage generated between two electrodes, to the power supply circuit 160 by terminals G and H. An electrode member 186 connected to a negative pole by a connecting member 176 on a circuit board 154 is provided on a right side of the ink cartridge 400a in the figure. Further, the electrode member 186 is configured so as to be in contact with the electrode member 185 of the ink cartridge 300a. As a result, a positive pole of the ink cartridge 300a is electrically conduced to a negative pole of the ink cartridge 400a.

In this modification, the electrode members 181 to 186 are elastic members which have electric conductivity. The electrode members 181 are fixed by an adhesion or the like to a side of an ink cartridge. Otherwise, the electrode members 181 to 186 may be metal plates having electric conductivity. The electrode members 181 to 186 each can have any shape, be made of any material, and be provided at any position insofar as the electrode members 181 to 186 are configured so as to make contact with each other when the ink cartridge is attached to the carriage 20.

As is apparent from the above descriptions, a voltage which the ink cartridges 100a to 400a supply to the power supply circuit 160 is a voltage obtained by connecting, in series, electromotive forces of all the ink cartridges between the terminals A and H. For example, if each ink cartridge generates an electromotive force of 1 V, a voltage of 1 V is obtained between terminals A and B, between terminals C and D, between terminals E and F, as well as between terminals G and H. Accordingly, a voltage between the terminals A and H is 4 V. If 4 V is sufficient for a power supply voltage, the voltage of 4 V can be directly used without boosting.

Also in this modification, if each ink cartridge generates an electromotive force of 1 V, for example, a voltage of 2 V is obtained between the terminals A and B, and a voltage of 3 V is obtained between the terminals A and F. Further, a voltage of 2 V is obtained between the terminals C and F as well as between the terminals E and H, and a voltage of 3 V is obtained between the terminals C and H. In this manner, different inter-terminal voltages can be obtained by selecting terminals. The power supply circuit 160 can appropriately attain a required voltage by selecting terminals.

There is a case that a required power supply voltage is defined by specifications and standards in the inkjet printer 10. In this case, a voltage corresponding to such a definite voltage is desirably supplied from an ink cartridge. For example, a consideration is now taken into a case that a voltage of 2 V is supplied to the power supply circuit 160 in order to generate a required power supply voltage. In this case, the electromotive force of each ink cartridge is 1 V in this modification, and therefore, electromotive forces of two ink cartridges may be connected in series with each other.

Figure 21:
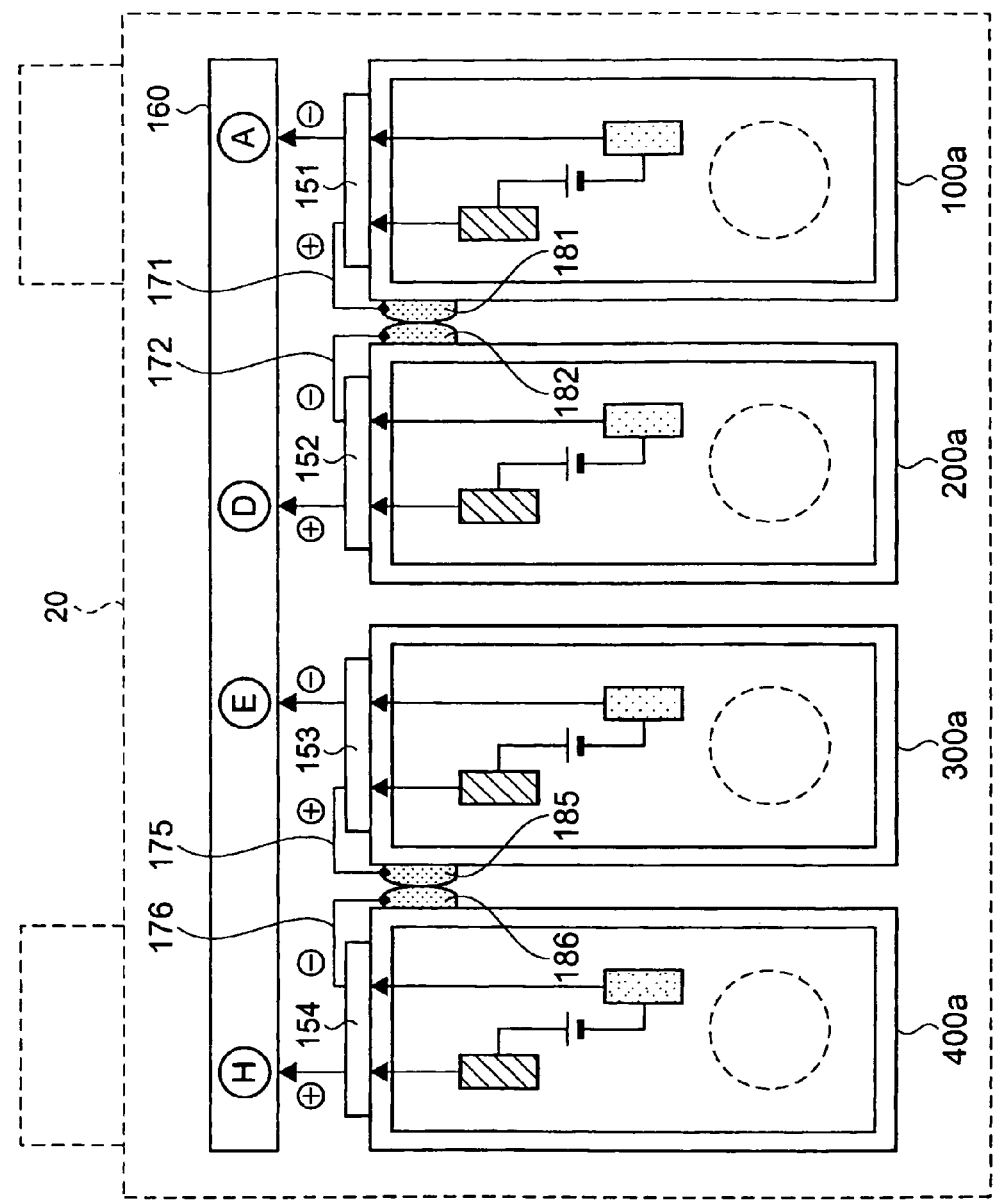
FIG. 21 shows a method of connecting ink cartridges according to the first modification of the fourth embodiment.

FIG. 21 shows a method of connecting ink cartridges in this modification. The ink cartridge 100a supplies an output from a negative pole of two electrodes to the power supply circuit 160 through the terminal A. Further, an electrode member 181 connected to a positive pole by a connecting member 171 on a circuit board 151 is provided on the left side of the ink cartridge 100a in the figure. On the other hand, the ink cartridge 200a supplies an output from a positive pole of a voltage between two electrodes, to the power supply circuit 160 by a terminal D. An electrode member 182 connected to a negative pole by a connecting member 172 on a circuit board 152 is provided on the right side of the ink cartridge 200a. The electrode member 182 is configured so as to make contact with the electrode member 181 of the ink cartridge 100a. With this configuration, the positive pole of the ink cartridge 100a and the negative pole of the ink cartridge 200a are electrically conducted to each other. Accordingly, a voltage of 2 V is generated between the terminals A and D.

In the same manner as described above, the ink cartridge 300a supplies an output from a negative pole of two electrodes to the power supply circuit 160 through the terminal A. Further, an electrode member 185 connected to a positive pole by a connecting member 175 on a circuit board 153 is provided on the left side of the ink cartridge 300a in the figure. The ink cartridge 400a supplies an output from a positive pole of two electrodes, to the power supply circuit 160 by a terminal H. An electrode member 186 connected to a negative pole by a connecting member 176 on a circuit board 154 is provided on the right side of the ink cartridge 300a. The electrode member 186 is configured so as to make contact with the electrode member 185 of the ink cartridge 300a. With this configuration, the positive pole of the ink cartridge 300a and the negative pole of the ink cartridge 400a are electrically conducted to each other. Accordingly, a voltage of 2 V is generated between the terminals E and H.

By connecting ink cartridges as shown in FIG. 21, a voltage supplied from the ink cartridges to the power supply circuit 160 is 2 V. Accordingly, a required power supply voltage can be supplied even without switching terminals.

The first modification has been described above, referring to an example in which an electromotive force of 1 V is generated by each ink cartridge. However, an electromotive force generated by one ink cartridge varies depending on configurations of electrodes and electrolyte solutions. In this case, the number and type of ink cartridges to be connected in series may be designed so that a required power supply voltage can be supplied.

4-2-2. Second Modification

The method of fixing the electrodes 110 and 120 to an ink container and positions where the electrodes 110 and 120 are fixed are not limited to those described in the fourth embodiment. In the fourth embodiment and the modification, the electrodes 110 and 120 are inserted in the ink containing part 105, with ends of the electrodes fixed to a bottom of the ink container 101 (shown in the lower side of the figure). However, any layout other than that described above may be adopted.

Figure 22A:
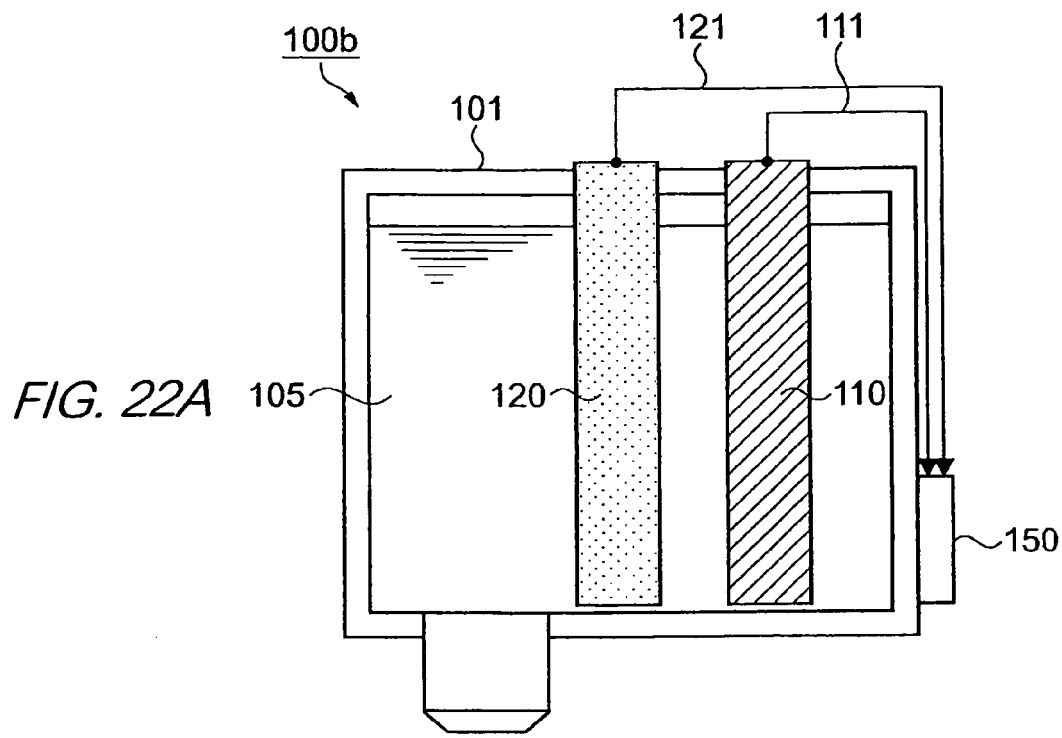
FIG. 22A shows an ink cartridge 100b as an example of the second modification.

FIG. 22A is a cross-sectional view schematically showing an ink cartridge 100b as an example of the second modification, viewed from one side as in FIG. 18. In the ink cartridge 100b, the electrodes 110 and 120 are located in the ink containing part 105, so as to be in contact with an ink contained in the ink containing part 105. Ends of the electrodes 110 and 120 are fixed to a sealing (in the upper side in the figure) of the ink container 101. An electromotive force generated between the electrodes is drawn from the top side of the ink cartridge 100b, and is led to the circuit board 150 by connecting members 122 and 121.

By fixing the electrodes 110 and 120 in a manner as described above, the ink is not in contact with fixing parts of the electrodes 110 and 120. Therefore, the ink does not leak from the fixing portions. Accordingly, air-tightness of sealing at the fixing portions need not strictly be managed, and manufacturing of each ink cartridge is facilitated.

Figure 22B:
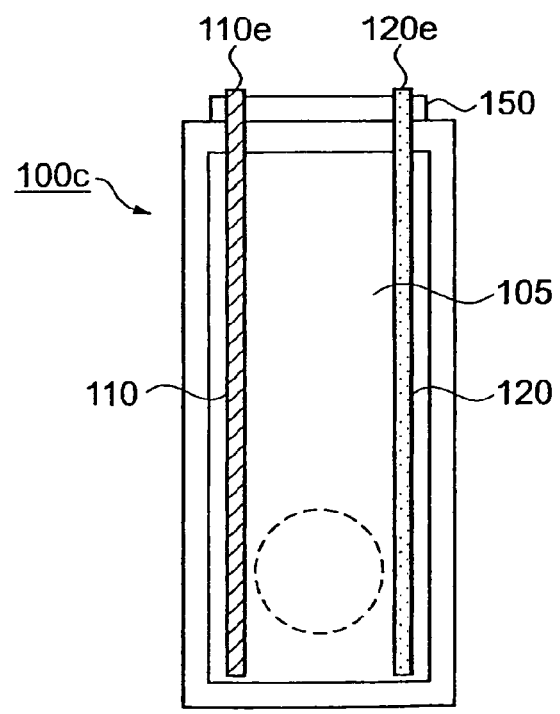
FIG. 22B shows an ink cartridge 100c as another example of the second modification.

FIG. 22B is a cross-sectional view schematically showing an ink cartridge 100c as another example of the second modification, viewed from a top of the ink cartridge 100 as in FIG. 19. In the ink cartridge 100c, the electrodes 110 and 120 are inserted in the ink containing part 105, with ends 110e and 120e of the respective electrodes 110 and 120 directly connected and fixed to the circuit board 150 provided on a side of the ink cartridge.

If the two electrodes are connected in this manner, an electromotive force generated between the two electrodes can be led directly to the circuit board 150 without using connecting members. With this configuration, manufacturing of the ink cartridge can be facilitated. In addition, no voltage drop is caused by connecting members. Therefore, decrease in the electromotive force of the ink cartridge is suppressed.

4-2-3. Other Modifications

Ink cartridges are not limited to those described in the fourth embodiment and modifications thereof described above. In the fourth embodiment and modifications thereof, four ink cartridges are provided. However, the number of attachable ink cartridges may be increased to six or decreased to two, for example. In the fourth embodiment and modifications described above, inks contained in the ink cartridges have respectively different colors. However, ink cartridges may contain inks having respectively different saturations or brightness in place of colors. In brief, any kind of ink can be contained insofar as the ink functions as an electrolyte solution.

In the fourth embodiment and modifications thereof, electromotive forces of the ink cartridges 100 are supplied to the power supply circuit 160 of the inkjet printer 10 through connecting units connected to the circuit board 150 (not shown), as shown in FIG. 18. However, the electromotive forces of the ink cartridges 100 may alternatively be supplied directly to the circuit board 150 or the like, without being supplied through the power supply circuit 160.

As has been described above, an IC chip which records individual information concerning an ink cartridge is mounted on the circuit board 150. For example, in the fourth embodiment and modifications thereof, an ink cartridge is used as a battery during an operation of recording onto or reading from the IC chip. In this manner, for example, if individual information is exchanged with the sub board 60 by a wireless communication unit, data can be exchanged without supplying an electric power through a connecting unit not shown.

Figure 23:
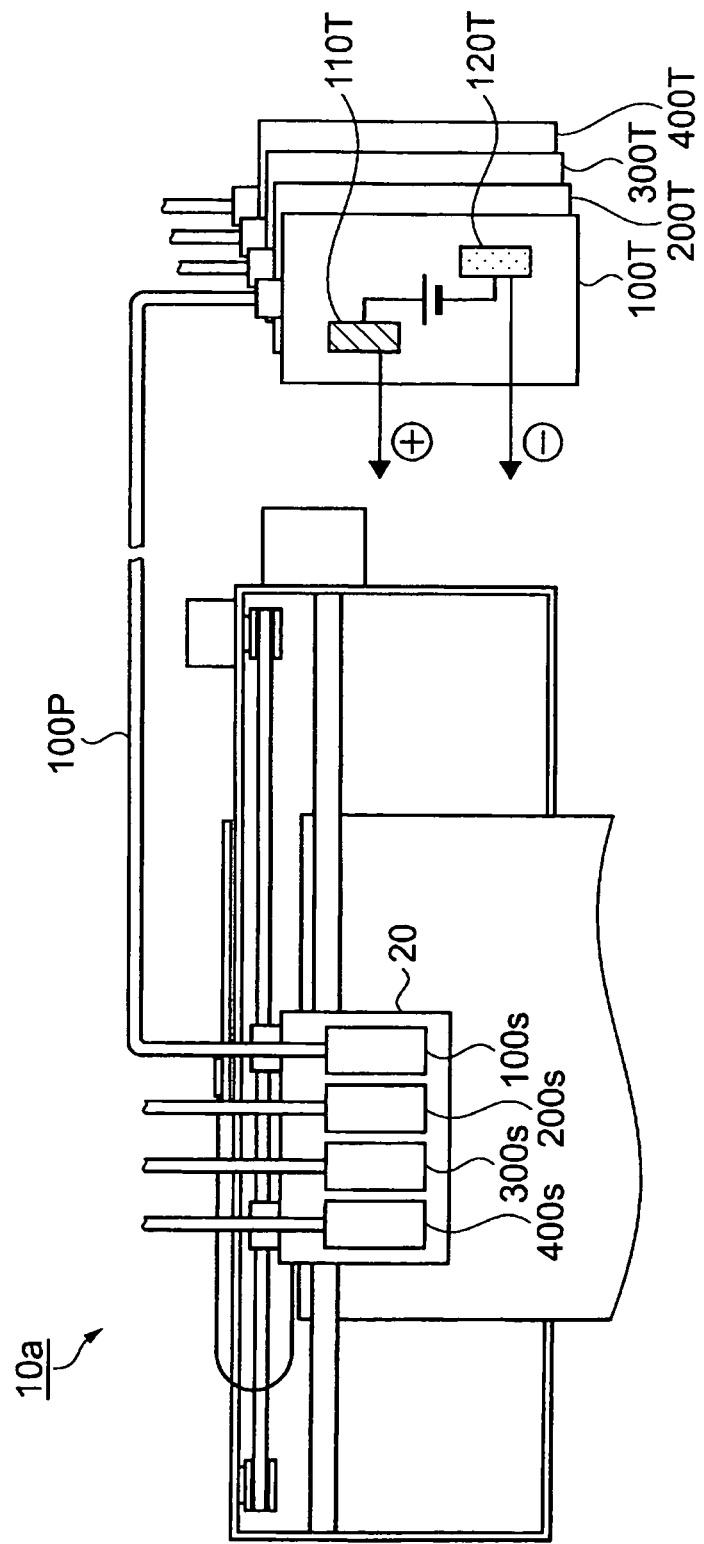
FIG. 23 shows an example of using ink tanks.

FIG. 23 shows an example of using ink tanks in place of ink cartridges. In this example, an inkjet printer 10a is configured so that inks are supplied to ink tanks 100T, 200T, 300T, and 400T respectively from sub tanks 100s, 200s, 300s, and 400s which are provided on a carriage 20 for different colors (though only one supply pipe 100P is shown and the other supply pipes are omitted from the figure).

As an ink tank 100T is shown as an example, two electrodes 110T and 120T having respectively different ionization tendencies are inserted into each ink tank. The two electrodes 110T and 120T make contact with a contained ink, thereby generating an electromotive force. One of the electrodes functions as a positive pole and the other one of the electrodes functions as a negative pole. A voltage generated between the two electrodes is output. Accordingly, the voltage which is output can be used as a power supply required for operating the inkjet printer 10a.

Ink tanks 100T to 400T are not attached to the carriage 20, unlike in case of ink cartridges. Therefore, there is a case that a containable volume of inks is large compared with that of ink cartridges 100 to 400. In this case, a combined total of the generated electromotive forces is accordingly large. That is, a greater electric power can be supplied by using ink tanks than by using ink cartridges. Accordingly, a stable supply of a voltage to the power supply circuit 160 can be expected.

Also in the fourth embodiment and modifications thereof, shapes of the electrodes 110 and 120 are not particularly described. However, the electrodes desirably have a shape which maximizes a generated electromotive force. For example, the shape of the electrodes may be experimentally determined.

5. Further Embodiments

Figure 24:
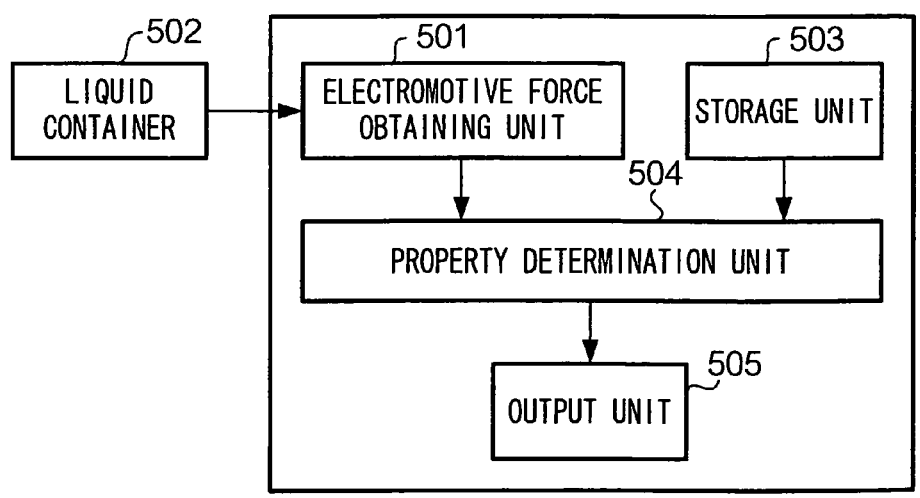
FIG. 24 shows a functional structure of a liquid property detection device.

FIG. 24 shows a functional structure of a liquid property detection device according to the first to fourth embodiments. An electromotive force obtaining unit 501 obtains an electromotive force generated between two electrodes in a liquid container 502. The liquid container 502 includes two electrodes and a liquid containing part. The two electrodes are made of metals which have respectively different ionization tendencies. The liquid containing part contains a liquid so that the liquid makes contact with the two electrodes. A storage unit 503 stores a table showing correspondences between liquid properties of a liquid contained in the liquid container 502 and electromotive forces. A property determination unit 504 determines a property of the liquid contained in the liquid container 502 by using an electromotive force obtained by the electromotive force obtaining unit 501 and a table stored in the storage unit 503. An output unit 505 outputs information associated with a property determined by the property determination unit 504.

In the first embodiment, an amount of a liquid is detected as a property. The electromotive force obtaining unit 501 corresponds to the recording unit 115 shown in FIG. 1. The liquid container 502 corresponds to ink cartridges 100, 200, 300, and 400. The storage unit 503 corresponds to a storage unit 113. The property determination unit 504 corresponds to the liquid calculation unit 116. An output unit 505 corresponds to the liquid amount information notification unit 117.

In the first embodiment, the liquid container 502 has the information recording unit 111 which stores information indicating a type of a liquid contained in the liquid container 502 (FIG. 1). The liquid property detection device has an information obtaining unit 112 as an information obtaining unit 112 indicating a type of a liquid (FIG. 1). The storage unit 503 stores plural tables corresponding to liquid types. The property determination unit 504 calculates an amount of a liquid contained in the liquid container 502, by using an electromotive force obtained by the electromotive force obtaining unit 501 and information obtained by the information obtaining unit.

In the first embodiment, the liquid container 502 has a measurement unit 114 as a measurement unit which measures an electromotive force generated between two electrodes. The electromotive force obtaining unit 501 obtains an electromotive force measured by the measurement unit of the liquid container 502. Otherwise, in place of the liquid container 502, the liquid property detection device itself (more specifically, the electromotive force obtaining unit 501) may have a measurement unit for measuring an electromotive force generated between the two electrodes. In this case, an electromotive force measured by the measurement unit of the electromotive force obtaining unit 501 is obtained.

In the second embodiment, a jet state is detected as a liquid property. The liquid jet device has a liquid jet unit 215 which performs a jetting operation for jetting a liquid contained in the liquid container 502 (FIG. 10). The liquid property detection device has an I/F 55 as an input unit which inputs a signal indicating execution of a jetting operation. Before and after the jetting operation indicated by the signal input by the input unit, the electromotive force obtaining 501 obtains electromotive forces generated between the two electrodes. The property determination unit 504 further calculates a decrease of a liquid from amounts of the liquid which are calculated by using electromotive forces before and after the jetting operation. The liquid property detection device has a determination unit 217 as a determination unit which determines whether or not a ratio between the decrease calculated by the decrease calculation unit and a jet amount of a liquid which should be jetted by the jetting operation is within a predetermined range (FIG. 10). The output unit 505 outputs information corresponding to a determination result obtained by the determination unit.

In the second embodiment, the electromotive force obtaining unit 501 corresponds to the liquid decrease calculation unit 212. The storage unit 503 corresponds to the recording unit 213. The property determination unit 504 corresponds to the liquid decrease calculation unit 212. The output unit 505 corresponds to the notification unit 218.

In the second embodiment, the liquid jet unit 215 can execute plural types of liquid jet operations including a liquid jet operation in which a liquid jet amount is constant. Among the plural liquid jet operations, the electromotive force obtaining unit 501 obtains electromotive forces before and after a liquid jet operation in which the liquid jet amount is constant. In addition, the determination unit determines whether or not a ratio between a decrease calculated by the property determination unit 504 and a jet amount of a liquid which should be jetted by the jetting operation is within each of plural predetermined ranges. The output unit 505 outputs information corresponding to a range within which the ratio falls.

In the third embodiment, a liquid type is detected as a liquid property. The electromotive force obtaining unit 501 corresponds to the recording unit 312 shown in FIG. 16. The storage unit 503 corresponds to the storage unit 313. The property determination unit 504 corresponds to the identification unit 314. The output unit 505 corresponds to the notification unit 315.

In the third embodiment, the liquid container 502 has a liquid information recording unit 316b which stores information indicating a type of a liquid to be contained in the liquid container 502 (FIG. 16). The liquid property detection device has the information obtaining unit 18 which obtains information indicating a type of a liquid from the liquid information recording unit of the liquid container 502 (FIG. 16). The liquid property detection device has a correspondence determination unit 319 as a determination unit which determines whether or not a type of a liquid indicated by information obtained by the information obtaining unit and a type of a liquid determined by the property determination unit 504 correspond to each other. The output unit 505 outputs information corresponding to a determination result made by the determination unit.

In the third embodiment, the liquid container 502 has a liquid amount information recording unit 316a which stores information indicating a liquid amount of a liquid contained in the liquid container 502 (FIG. 16). The liquid property detection device has a detection unit 317. The detection device obtains liquid amount information from the liquid amount information recording unit 316a of the liquid container 502, and detects whether or not the liquid container 502 is filled with a liquid, based on the obtained liquid amount information. If the detection unit determines that the liquid container 502 is filled with a liquid, the electromotive force obtaining unit 501 obtains an electromotive force.

In the first to fourth embodiments, the liquid container 502 has two electrodes (electrodes 110 and 120), a containing part 105, and a supply port 107. The two electrodes are consist of metals which have respectively different ionization tendencies. The containing part 105 contains a liquid jetted from the liquid jet device to a recording medium so as to make contact with the two electrodes. Through the supply port 107, the liquid contained in the containing part is supplied to the liquid jet device. Further, the liquid container 502 has an attachment unit 130 which can be attached/detached to/from the liquid jet device.

In the fourth embodiment, the liquid containers 502 have connecting units (such as connecting members 171 to 175 and 181 to 186 shown in FIG. 21) for connecting electrodes so that electromotive forces each generated between two electrodes of one of the adjacent liquid containers are connected in series between each adjacent liquid containers when liquids are supplied to liquid jet devices from plural liquid containers 502.

In the fourth embodiment, the connecting units connect electrodes so that the electromotive forces which are connected in series are set to a predetermined voltage. Further, the liquids contained in the plural liquid containers 502 differ from each other with respect to at least one of hue, saturation, and brightness.

In the first to fourth embodiments, the image forming device includes: a liquid container 502; an electromotive force obtaining unit 501 which obtains an electromotive force generated between two electrodes in the liquid container 502; a storage unit 503 which stores a table indicating correspondences between electromotive forces and properties of a liquid contained in the liquid container 502; a property determination unit 504 which determines a property of the liquid contained in the liquid container 502, by using the electromotive force obtained by the electromotive force obtaining unit 501 and the table stored in the storage unit 503; an output unit 505 which outputs information corresponding to the property determined by the property determination unit 504; and a liquid jet unit which performs a jetting operation of jetting the liquid contained in the liquid container 502.

At least a part of technical features described in any of the embodiments and modifications thereof as has been described above can be used in combination with another one of the other embodiments or modifications thereof. Alternatively, at least a part of the technical features described in any of the embodiments and modifications thereof as has been described above can be used, replaced with at least a part of the technical features of another one of the other embodiments or modifications thereof.

Correspondences between hardware structures and functional structures are not limited to those described in each of the embodiments. For example, in the first embodiment, the CPU 51 also performs functions as the information obtaining unit 112, recording unit 115, liquid amount calculation unit 116, and liquid amount information notification unit 117.

However, a part of such functions may be performed by a processor other than the CPU 51. Otherwise, plural processors may perform functions as one single functional component. Still otherwise, only a part of the steps in the flowcharts in FIGS. 5, 11, 14, and 17 may be executed by a processor other than the CPU 51.

What is claimed is:

1. A liquid property detection device comprising:
   a first electrode that is in a liquid container and is formed by a first metal having a first ionization tendency;
   a second electrode that is in the liquid container and is formed by a second metal having a second ionization tendency which is different from the first ionization tendency;
   an electromotive force obtaining unit configured to obtain an electromotive force which is generated between the first electrode and the second electrode in the liquid container, and the liquid container containing a liquid so that the liquid is in contact with the first electrode and the second electrode;
   a storage unit configured to store a table showing correspondence between a property of the liquid contained in the liquid container and the electromotive force;
   a property determination unit configured to determine the property of the liquid contained in the liquid container on the basis of the electromotive force obtained by the electromotive force obtaining unit and the table stored in the storage unit; and
   an output unit configured to output information corresponding to the property determined by the property determination unit.

2. The liquid property detection device according to claim 1, wherein the property is an amount of the liquid.

3. The liquid property detection device according to claim 2, wherein
   the liquid container includes an information recording unit that is configured to store information indicating a type of the liquid contained in the liquid container,
   the liquid property detection device further comprises an information obtaining unit configured to obtain information indicating a type of the liquid, from the information recording unit of the liquid container,
   the storage unit is configured to store a plurality of tables respectively corresponding to types of liquids, and
   the property determination unit is configured to calculate an amount of the liquid contained in the liquid container, by using the electromotive force obtained by the electromotive force obtaining unit, and one of the plurality of tables corresponding to the type of the liquid indicated by the information obtained by the information obtaining unit.

4. The liquid property detection device according to claim 2, further comprising an input unit configured to input a signal indicating an execution of a jetting operation, from a liquid jet device having a liquid jet unit which performs a jetting operation of jetting the liquid contained in the liquid container, wherein
   the electromotive force obtaining unit is configured to obtain the electromotive force generated between the first electrode and the second electrode, before and after the jetting operation indicated by the signal which is input by the input unit,
   the property determination unit is further configured to calculate a decrease of the liquid, from amounts of the liquid which are obtained before and after the jetting operation by the property determination unit, by using electromotive forces obtained before and after the jetting operation,
   the liquid property detection device further comprises a determination unit configured to determine a ratio between the decrease calculated by the property determination unit and a jet amount of the liquid which should be jetted by the jetting operation, and
   the output unit is configured to output information corresponding to a determination result of the determination unit.

5. The liquid property detection device according to claim 4, wherein
   the liquid jet unit can execute a plurality of jetting operations including a jetting operation in which a jet amount of the liquid is constant, and
   the electromotive force obtaining unit is configured to obtain electromotive forces before and after the jet amount of the liquid is constant among the plurality of liquid jetting operations.

6. The liquid property detection device according to claim 4, wherein
   the determination unit is configured to determine whether or not the ratio between the decrease calculated by the property determination unit and the jet amount of the liquid which should be jetted by the jetting operation falls within each of a plurality of ranges, and
   the output unit is configured to output information corresponding to one of the plurality of ranges in which the ratio falls.

7. The liquid property detection device according to claim 1, wherein the electromotive force obtaining unit includes a measurement unit configured to measure the electromotive force generated between the first electrode and the second electrode, and
   the electromotive force obtaining unit is configured to obtain the electromotive force measured by the measurement unit.

8. The liquid property detection device according to claim 1, wherein the liquid container includes a measurement unit configured to measure the electromotive force generated between the first electrode and the second electrode, and
   the electromotive force obtaining unit is configured to obtain the electromotive force measured by the measurement unit.

9. The liquid property detection device according to claim 1, wherein the property is a type of a liquid.

10. The liquid property detection device according to claim 9, wherein
    the liquid container includes a liquid information recording unit configured to store information indicating the type of the liquid to be contained in the liquid container,
    the liquid property detection device further comprises
    an information obtaining unit configured to obtain information indicating the type of the liquid, from the liquid information recording unit of the liquid container, and
    a determination unit configured to determine whether or not the type of the liquid indicated by the information obtained by the information obtaining unit, and the type of the liquid determined by the property determination unit correspond to each other, and
    the output unit is configured to output information corresponding to a determination result of the determination unit.

11. The liquid property detection device according to claim 9, wherein the liquid container includes a liquid information recording unit configured to store liquid amount information indicating an amount of the liquid contained in the liquid container, the liquid property detection device further comprises a detecting unit configured to obtain the liquid amount information from the liquid amount recording unit of the liquid container, and detect whether the liquid container is filled with the liquid or not, based on the obtained liquid amount information, and the electromotive force obtaining unit is configured to obtain the electromotive force if the liquid container is determined to be filled with the liquid by the detection unit.

12. The liquid property detection device according to claim 1, wherein the first electrode and the second electrode disposed in the liquid container and the liquid constitute a voltaic battery, and the electromotive force obtaining unit measures the electromotive force generated when the first electrode and the second electrode dissolve in the liquid.

13. A liquid container comprising:
a first electrode that is formed by a first metal having a first ionization tendency;
a second electrode that is formed by a second metal having a second ionization tendency which is different from the first ionization tendency;
a containing part configured to contain a liquid to be jetted to a recording medium from a liquid jet device, with the liquid maintained in contact with the first electrode and the second electrode; and
a supply port configured to supply the liquid contained in the containing part to the liquid jet device.

14. The liquid container according to claim 13, further comprising an attachment unit that can be attached/detached to/from the liquid jet device.

15. A plurality of liquid containers, each of the liquid containers corresponding to the liquid container of claim 13, comprising:
a connecting unit configured to connect the first electrode and the second electrode in a manner that when the liquid is supplied from the plurality of liquid containers, an electromotive force generated between the first electrode and the second electrode in one of the plurality of liquid containers is connected in series with an electromotive force generated between the first electrode and the second electrode in an adjacent one of the plurality of liquid containers.

16. The liquid container according to claim 15, wherein the connecting unit is configured to connect the first electrode and the second electrode in a manner that the electromotive forces connected in series have a predetermined voltage.

17. The liquid container according to claim 15, wherein the plurality of the liquid containers is respectively configured to contain liquids which differ from each other with respect to at least one of hue, saturation, and brightness.

18. An image forming device comprising:
a liquid container including
a first electrode that is formed by a first metal having a first ionization tendency;
a second electrode that is formed by a second metal having a second ionization tendency which is different from the first ionization tendency; and
a containing part for containing a liquid so as to be in contact with the first electrode and the second electrode;
a liquid property detection device including
an electromotive force obtaining unit configured to obtain an electromotive force which is generated between the first electrode and the second electrode in the liquid container,
a storage unit configured to store a table showing correspondence between a property of the liquid contained in the liquid container and the electromotive force,
a property determination unit configured to determine the property of the liquid contained in the liquid container on the basis of the electromotive force obtained by the electromotive force obtaining unit and the table stored in the storage unit; and
an output unit configured to output information corresponding to the property determined by the property determination unit; and
a liquid jet unit configured to perform a jetting operation for jetting the liquid contained in the liquid container.

19. A liquid property detection method comprising:
obtaining an electromotive force which is generated between a first electrode and a second electrode in a liquid container, the first electrode being formed by a first metal having a first ionization tendency, the second electrode being formed by a second metal having a second ionization tendency which is different from the first ionization tendency, and the liquid container containing a liquid so that the liquid is in contact with the first electrode and the second electrode;
storing a table showing correspondence between a property of the liquid contained in the liquid container and the electromotive force;
determining the property of the liquid contained in the liquid container, by using the obtained electromotive force and the stored table; and
outputting information corresponding to the determined property.

* * * * *